(12) United States Patent
Waid et al.

(10) Patent No.: US 11,125,082 B2
(45) Date of Patent: Sep. 21, 2021

(54) SYSTEMS AND METHODS FOR MONITORING CHANGES IN A FORMATION WHILE DYNAMICALLY FLOWING FLUIDS

(71) Applicants: PIETRO FIORENTINI SPA, Arcugnano (IT); PIETRO FIORENTINI (USA), INC, Wheeling, WV (US)

(72) Inventors: Margaret Waid, Houston, TX (US); Mohamed Hashem, Houston, TX (US); Paolo Nardi, Milan (IT); Michael Yuratich, Hamble (GB)

(*) Notice: Subject to any disclaimer, the term of this patent is extended or adjusted under 35 U.S.C. 154(b) by 500 days.

(21) Appl. No.: 15/745,219

(22) PCT Filed: Jul. 20, 2016

(86) PCT No.: PCT/US2016/043090
§ 371 (c)(1),
(2) Date: Jan. 16, 2018

(87) PCT Pub. No.: WO2017/015340
PCT Pub. Date: Jan. 26, 2017

(65) Prior Publication Data
US 2018/0171788 A1    Jun. 21, 2018

Related U.S. Application Data

(60) Provisional application No. 62/194,612, filed on Jul. 20, 2015.

(51) Int. Cl.
*E21B 49/10*      (2006.01)
*G01V 5/10*      (2006.01)
(Continued)

(52) U.S. Cl.
CPC .............. *E21B 49/10* (2013.01); *E21B 33/12* (2013.01); *E21B 49/008* (2013.01); *E21B 49/08* (2013.01);
(Continued)

(58) Field of Classification Search
CPC ........ E21B 49/10; E21B 49/08; E21B 49/008; E21B 49/088; E21B 49/081; G01V 5/107; G01V 5/10; G01V 5/108
See application file for complete search history.

(56) References Cited

U.S. PATENT DOCUMENTS

| 2,747,401 A | 5/1956 | Doll |
| 3,295,615 A | 1/1967 | Brieger et al. |

(Continued)

OTHER PUBLICATIONS

Aristides Orlandi Neto et al. Successful Application of New LWD Platform Provides Integrated Real-Time Formation Evalutation in the Mediterranean Reservoirs (Society of Petroleum Engineers; SPE 122585) 2009.

(Continued)

*Primary Examiner* — Blake E Michener
(74) *Attorney, Agent, or Firm* — Matthew J Patterson

(57) ABSTRACT

Methods and systems for measuring neutron sigma of downhole reservoir as a function of time for a predetermined testing volume are disclosed. The methods and systems of the present invention analyze the testing volume while maintaining the formation in the testing volume in an unchanged and undamaged state and while dynamically flowing fluids in and out of the testing volume. The systems and methods of the present invention are especially important in determining petrophysical information about the reservoir as well as the in-situ effect of substances on enhanced oil recovery.

9 Claims, 10 Drawing Sheets

(51) Int. Cl.
　　　*E21B 33/12*　　　(2006.01)
　　　*E21B 49/00*　　　(2006.01)
　　　*E21B 49/08*　　　(2006.01)

(52) U.S. Cl.
　　　CPC .......... *E21B 49/081* (2013.01); *E21B 49/088* (2013.01); *G01V 5/107* (2013.01); *G01V 5/108* (2013.01); *E21B 49/0875* (2020.05)

(56) References Cited

U.S. PATENT DOCUMENTS

| | | | |
|---|---|---|---|
| 3,323,361 A | 6/1967 | Lebourg | |
| 3,352,361 A | 11/1967 | Urbanosky | |
| 3,385,364 A | 5/1968 | Whitten | |
| 3,934,468 A | 1/1976 | Brieger | |
| 4,287,946 A | 9/1981 | Brieger | |
| 4,384,205 A * | 5/1983 | Flaum | G01N 23/025 250/265 |
| 4,507,554 A * | 3/1985 | Hertzog | G01V 5/108 250/269.8 |
| 4,535,843 A | 8/1985 | Jageler | |
| 4,635,717 A | 1/1987 | Jageler | |
| 4,860,581 A | 8/1989 | Zimmerman et al. | |
| 4,879,900 A | 11/1989 | Gilbert | |
| 5,166,747 A | 11/1992 | Schroeder et al. | |
| 5,230,244 A | 7/1993 | Gilbert | |
| 5,265,015 A | 11/1993 | Auzerais et al. | |
| 5,266,800 A | 11/1993 | Mullins | |
| 5,279,153 A | 1/1994 | Dussan et al. | |
| 5,303,775 A | 4/1994 | Michaels et al. | |
| 5,337,821 A | 8/1994 | Peterson | |
| 5,473,939 A | 12/1995 | Leder et al. | |
| 5,540,280 A | 7/1996 | Schultz et al. | |
| 5,587,525 A | 12/1996 | Shwe et al. | |
| 5,770,798 A | 6/1998 | Georgi et al. | |
| 5,799,733 A | 9/1998 | Ringgenberg et al. | |
| 5,859,430 A | 1/1999 | Mullins et al. | |
| 5,934,374 A | 8/1999 | Hrametz et al. | |
| 5,939,717 A | 8/1999 | Mullins | |
| 6,301,959 B1 | 10/2001 | Hrametz et al. | |
| 6,350,986 B1 | 2/2002 | Mullins et al. | |
| 6,446,719 B2 | 9/2002 | Ringgenberg et al. | |
| 6,467,544 B1 | 10/2002 | Brown et al. | |
| 6,474,152 B1 | 11/2002 | Mullins et al. | |
| 6,476,384 B1 | 11/2002 | Mullins et al. | |
| 6,478,096 B1 | 12/2002 | Jones et al. | |
| 6,585,045 B2 | 7/2003 | Lee et al. | |
| 6,609,568 B2 | 8/2003 | Krueger et al. | |
| 6,658,930 B2 | 8/2003 | Arian | |
| 6,622,554 B2 | 9/2003 | Manke et al. | |
| 6,627,873 B2 | 9/2003 | Tchakarov et al. | |
| 6,659,177 B2 | 12/2003 | Bolze et al. | |
| 6,668,924 B2 | 12/2003 | Bolze et al. | |
| 6,702,017 B1 | 3/2004 | Corrigan | |
| 6,707,556 B2 | 3/2004 | Turner et al. | |
| 6,714,872 B2 | 3/2004 | DiFoggio et al. | |
| 6,719,049 B2 | 4/2004 | Sherwood et al. | |
| 6,722,432 B2 | 4/2004 | Spiers et al. | |
| 6,729,399 B2 | 5/2004 | Follini et al. | |
| 6,745,835 B2 | 6/2004 | Fields | |
| 6,768,105 B2 | 7/2004 | Mullins et al. | |
| 6,769,296 B2 | 8/2004 | Montalvo et al. | |
| 6,817,229 B2 | 11/2004 | Han et al. | |
| 6,843,118 B2 | 1/2005 | Weintraub et al. | |
| 6,871,713 B2 | 3/2005 | Meister et al. | |
| 6,877,559 B2 | 4/2005 | Hashem | |
| 7,031,841 B2 | 4/2006 | Zazovsky | |
| 7,036,579 B2 | 5/2006 | Follini et al. | |
| 7,062,958 B2 | 6/2006 | Diakonov et al. | |
| 7,086,463 B2 | 8/2006 | Ringgenberg et al. | |
| 7,090,012 B2 | 8/2006 | Hill et al. | |
| 7,096,976 B2 | 8/2006 | Paluch et al. | |
| 7,121,338 B2 | 10/2006 | van Zuilekom et al. | |
| 7,173,239 B2 | 2/2007 | diFoggio | |
| 7,178,392 B2 | 2/2007 | Dhruva et al. | |
| 7,178,591 B2 | 2/2007 | Zazovsky et al. | |
| 7,222,524 B2 | 5/2007 | Shammai | |
| 7,234,521 B2 | 6/2007 | Shammai et al. | |
| 7,263,881 B2 | 9/2007 | Ramakrishnan | |
| 7,458,252 B2 | 12/2008 | Freemark et al. | |
| 7,458,419 B2 | 12/2008 | Nold et al. | |
| 7,484,563 B2 | 2/2009 | Zazovsky et al. | |
| 7,594,541 B2 | 9/2009 | Fisseler et al. | |
| 7,665,354 B2 | 2/2010 | Shammai | |
| 7,703,517 B2 | 4/2010 | Tarvin et al. | |
| 7,726,396 B2 | 6/2010 | Briquet et al. | |
| 7,866,387 B2 | 1/2011 | van Zuilekom et al. | |
| 7,878,244 B2 | 2/2011 | Nold, III et al. | |
| 7,934,547 B2 | 5/2011 | Milkovisch et al. | |
| 7,958,936 B2 | 6/2011 | McGregor et al. | |
| 8,109,157 B2 | 2/2012 | Kanayama et al. | |
| 8,210,260 B2 * | 7/2012 | Milkovisch | E21B 49/008 166/264 |
| 8,555,968 B2 | 10/2013 | Zazovsky et al. | |
| 8,561,698 B2 | 10/2013 | Harrigan et al. | |
| 8,794,318 B2 | 8/2014 | Harrigan et al. | |
| 8,899,323 B2 | 12/2014 | Zazovsky et al. | |
| 8,901,483 B2 | 12/2014 | Roscoe et al. | |
| 8,969,793 B2 | 3/2015 | Stoller et al. | |
| 2005/0182566 A1 | 8/2005 | DiFoggio | |
| 2007/0079962 A1 * | 4/2007 | Zazovsky | E21B 49/10 166/264 |
| 2009/0008079 A1 * | 1/2009 | Zazovsky | E21B 36/04 166/60 |
| 2012/0116732 A1 * | 5/2012 | Barnes | G01V 5/107 703/2 |
| 2014/0124659 A1 * | 5/2014 | Berheide | G01T 3/06 250/269.4 |
| 2014/0319330 A1 * | 10/2014 | Berheide | G01T 3/06 250/269.5 |
| 2014/0332678 A1 * | 11/2014 | Tkabladze | G01V 5/104 250/269.2 |
| 2015/0090446 A1 | 4/2015 | Daito et al. | |
| 2015/0247948 A1 * | 9/2015 | Zhou | G01V 5/101 250/252.1 |
| 2015/0268376 A1 * | 9/2015 | Zhou | G01V 5/107 250/254 |
| 2016/0154141 A1 | 6/2016 | Moake | |
| 2017/0315259 A1 * | 11/2017 | Quirein | G01V 5/102 |

OTHER PUBLICATIONS

Rogers, R. E. Coalbed Methane: Principles and Practices. 6.3.5 Nuclear Measurements, pp. 304-308. (Prentice Hall Petroleum Engineering) 2007.

Edwin Ortega et al. Multidetector LWD Sigma Logging Principles, Petrophysical Applications, and Environmental Effects (SPWLA 54th Annual Logging Symposium) Jun. 22-26, 2013.

* cited by examiner

APPENDIX B

SYSTEMS AND METHODS FOR MONITORING CHANGES IN A FORMATION WHILE DYNAMICALLY FLOWING FLUIDS

CROSS-REFERENCE TO RELATED APPLICATIONS

This application claims priority under 35 U.S.C. § 371 to PCT Application No. PCT/US2016/043090 filed 20 Jul. 2016, which claims the benefit of U.S. Provisional Patent Application Ser. No. 62/194,612 filed 20 Jul. 2015. The disclosures of both applications above are incorporated herein by reference in their entireties.

BACKGROUND OF THE INVENTION

Field of the Invention

Embodiments of the invention generally relate to tools and techniques for performing dynamic formation testing and, more particularly, to monitoring changes in the formation over time, at a static depth, while dynamically flowing fluids.

Description of the Related Art

It is known in the oil and gas industry to measure the petrophysical parameters of a permeable subsurface formation. Typical permeable formations include pore spaces through which various fluids flow. Determining the permeabilities, saturations, and other parameters of oil, water or gas in the formation is useful in estimating the production capability of any particular well.

The use of logging tools are well known in the art to measure and calculate various physical parameters of the formation determining the production capability of a well and include measurement while drilling (MWD) and logging while drilling (LWD) and basic logging tools. Such logging tools may include sources that emit energy into the formation and further include sensors that detect and record return signals from the energy sources after their interaction with the formation. The various sources include sonic, induction, nuclear magnetic resonance, resistivity, nuclear and electromagnetic and the sources are matched with appropriate complimentary sensors. The logging tools are traversed within the wellbore at a predetermined rate (logging speed) and the emission of energy, and thereby the detection of the return energy, is set to a predetermined schedule. The logging tools of the prior art produce an output of the parameters of interest as a function of depth, typically referred to simply as a log. The log is a snapshot in time of the well along the length of the well. Since wells are dynamic by nature, the log at any given period of time may not be indicative of the formation over time. One other known problem with logging is that the energy from the source traverses drilling mud and mudcake before, as will be more fully described herein after, and after interacting with the formation produces results that must be properly manipulated in an attempt to correct for this interaction.

Many logging tools employ an electronic source for generating neutrons known as pulsed neutron generators (PNG) or pulsed neutron-neutron generators (PNN). The advantages of using an electronic source for generating neutrons are chiefly the elimination of dangerous chemical sources and optional higher neutron energy. Formation measurements are derived from the interaction between neutrons and the formation as the logging tool is moved along the borehole at a logging speed. Such neutron tools of the prior art have been used in well logging operations giving a sigma log of the well as a function of depth. An exemplary description of this prior art is given in Ortega, Edwin, et al, 2013, Multidetector LWD Sigma Logging Principles, Petrophysical Applications, and Environmental Effects: Paper presented at SPWLA 54$^{th}$ Annual Logging Symposium in New Orleans, La., June 22-26, the content of which is incorporated herein in its entirety.

In such sigma neutron logging operations, pulsed neutron generation and capture data is taken as a burst of neutrons slow down and then decay in a formation. In the simplest approximation, the inverse of the time constant of the exponential rate of decay of the signal with time when the neutrons are thermalized (thermal neutrons) is the formation sigma and is related to a physical property of the rocks and fluids in the formation, like porosity and water salinity. Sigma is utilized to compute, among other things, water saturation and steam saturation. Pulsed neutron generation and capture are used primarily to obtain petrophysical properties during logging operations as a function of depth. Pulsed neutron generation and capture tools function by emitting a sequence of bursts of neutrons into the borehole and surrounding formation. As the neutrons spread out, scintillation detectors, spaced apart from the source are used to measure the gamma rays produced by neutron interactions with the media. Alternatively, ionization detectors may be used to directly detect arriving neutrons. The detector measurements are recorded as a function of time as the tool moves along the borehole. In such prior art tools the neutron flux is related to both the neutron flux in the borehole, mud, mudcake and in the formation. This factor makes it difficult to precisely obtain a sigma for the formation related to the petrophysical information of the formation alone and corrections termed environmental corrections are applied.

Wireline formation testing tools are well known in the prior art for providing permeability, mobility, sampling and other information that can be inferred therefrom about the reservoir. Typical wireline tools extract fluids from the formation and analyze the fluids within the tool using various known detections, sensors and analyzers. Examples of such wireline testers of the prior art include U.S. Pat. Nos. 6,768,105, 7,036,579, 6,745,835, 3,121,459, 5,540,280, 5,934,374, 6,843,118, 5,329,811, 4,893,505, 5,662,166, 5,473,939, 5,803,186, 7,807,962, and 8,281,646 all of which are incorporated herein by reference.

Formation testing of the prior art typically takes care to ensure the fluids remain in a single phase within the tool. Many such testers include a gas bubble, or gas break out, detector. It is known that if the fluid pressure drops below the bubble point of one of its volatile components, the sample will no longer be representative of the formation and/or problems such as the irreversible precipitation of asphaltenes may arise. The above measured characteristics are made in a manner known in the prior art and they are performed on the fluid once it has left the formation. However, it is possible for gas to break out within the formation itself at points where the pressure is below the bubble point (saturation) pressure of oil. If there is gas breakout in the formation, the pumped (and sampled) oil and gas may no longer be representative (it may have a different apparent gas:oil ratio, GOR) and the effective permeability within the formation will be affected. However, there is no known method to determine whether gas breakout has occurred in the formation or within the testing tool nor to determine the bubble point pressure within the formation.

Most formation testing relies on measurements made in a laboratory. Fluid samples and core samples are delivered to a laboratory where lab technicians try to replicate downhole conditions. Laboratory measurements can be limited in how they can represent real in situ conditions, for example, to represent the reservoir, core plugs need to be stressed uniformly and tri-axially, the calculations leading to that are of limited accuracy, as they never exactly replicate the in situ conditions precisely. In addition, some of the fluids that are used in the lab experiments are not the reservoir fluids due to safety reasons, and the level of synthetic oil representation to the true formation oil adds more uncertainty.

It is known that companies involved in the production of hydrocarbons strive to produce as much of the reserves within any given formation as possible. At the beginning of the life cycle of a well, wireline formation testers are used to determine many factors that predict how the well will perform. Later in the life cycle of a well, the production rate will taper off for many known and unknown reasons such as water break through, decreased porosity, mobility and permeability among others. Steps are taken to increase the production of a well that are commonly referred to as enhanced oil recovery or EOR. Using EOR techniques, 30 to 60 percent or more, of the reservoir's oil can be produced compared with 20 to 40 percent in normal production. In certain EOR operations, fluids or gases are injected into wells positioned adjacent to the producing well. Known EOR techniques include steam injection, gas injection ($CO_2$, nitrogen, natural gas, etc.), steam flooding, chemical injection (polymers, surfactants, micro emulsions, dilute hydrogen peroxide, etc.), microbial injection, among others. In addition to the particular fluid, gas or technique to be used, the main parameters in which companies are interested in EOR include the rate of injection, the time to break through, incremental recovery, and the miscibility pressure. Many companies employ laboratory testing performed on cores taken from wells to assist in predicting which material and technique, or combinations thereof, to choose for EOR. Unfortunately, using current techniques, the results of any interaction may take months to years to be fully realized and may be unreliable to the extent that reservoir conditions and fluids at the producing zone are not fully replicated.

Some logging tools in the prior art include the capability to inject EOR materials and are commonly referred to as log-inject-log tools. The logging tools perform an initial logging trip in the borehole to establish baseline conditions. The tools are then positioned within the borehole and preselected EOR materials are injected into the formation. A second logging trip is undertaken and the initial log is compared to the second log to determine whether the EOR material had any beneficial effect. One problem with such a technique is that it may be difficult to detect the differences between logging runs. Another problem is that it is nearly impossible to find the original injection spot and therefore it is difficult to use a combination of EOR materials in succession to determine the combined effect. A further problem is that the quantity of EOR material injected at a particular depth is also undetermined, in relation to the effect it had.

Therefore, there exists a need for providing in-situ, real time information related to formation fluid dynamics in the temporal space.

SUMMARY OF THE INVENTION

In accordance with some aspects of the present disclosure, methods and systems related to a formation tester mounted electronic neutron generator and detector combinations obtaining neutron measurements versus time from pulsed neutron capture and inelastic scattering decay curves are disclosed. The method includes predetermining a depth of testing having a testing volume and disposing the electronic neutron generator in proximity thereto and emitting neutrons into the formation. A detector provides thermal neutron capture data and computer modeling and statistical analyses are used to obtain sigma values relating to one or more reservoir properties. The method further includes continuously pumping fluids from the reservoir testing volume while obtaining sigma values to determine saturation values versus time. Inelastic scattering and epithermal neutron data may be used to augment the sigma measurements.

In some aspects of the present invention, EOR substances are injected into the testing volume of a reservoir and the injection volumes and pressures together with the sigma values of the testing volume are used to determine the effect of such substances on enhanced oil recovery.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention is a formation dynamic testing (FDT) tool which includes an excitation source for deriving detailed information about the formation in real time as a function of time at a fixed position within the borehole. Certain embodiments of the present invention may employ a radiation source such as a chemical source, a pulsed neutron generator, or other electronic neutron generator (collectively referred to herein as neutron generator source), a sonic source, an induction source, nuclear magnetic resonance, resistivity or other known source as an excitation source for the reservoir to capture the dynamic information related to formation parameters versus time. The present invention may comprise a wireline deployed formation tester or an LWD/MWD tool having the ability to dynamically flow fluids to and/or from the reservoir while producing parameter data versus time at a fixed position within the well bore. The present invention also includes the ability to derive detailed saturation information in real time as a function of time at a fixed position within the borehole while controllably changing formation conditions. The present invention further includes multiple neutron and gamma ray detectors for measuring nuclear reactions over a wide energy range, including inelastic scattering, epithermal neutrons and thermal neutrons, and instrumentation for neutron spectroscopy. Epithermal neutron measurements may provide a neutron porosity; inelastic scattering measurements may provide information on carbon and oxygen content. In certain embodiments of the present invention, sigma is derived from the use of thermal-neutron capture detectors and neutron capture gamma ray detectors positioned at varying distances along the tool from the detector and across the fixed position in the wellbore and commonly referred to as near and far detectors. The control and computing features of the present invention includes features within the formation testing tool itself as well as features located at the surface.

Figure 1:
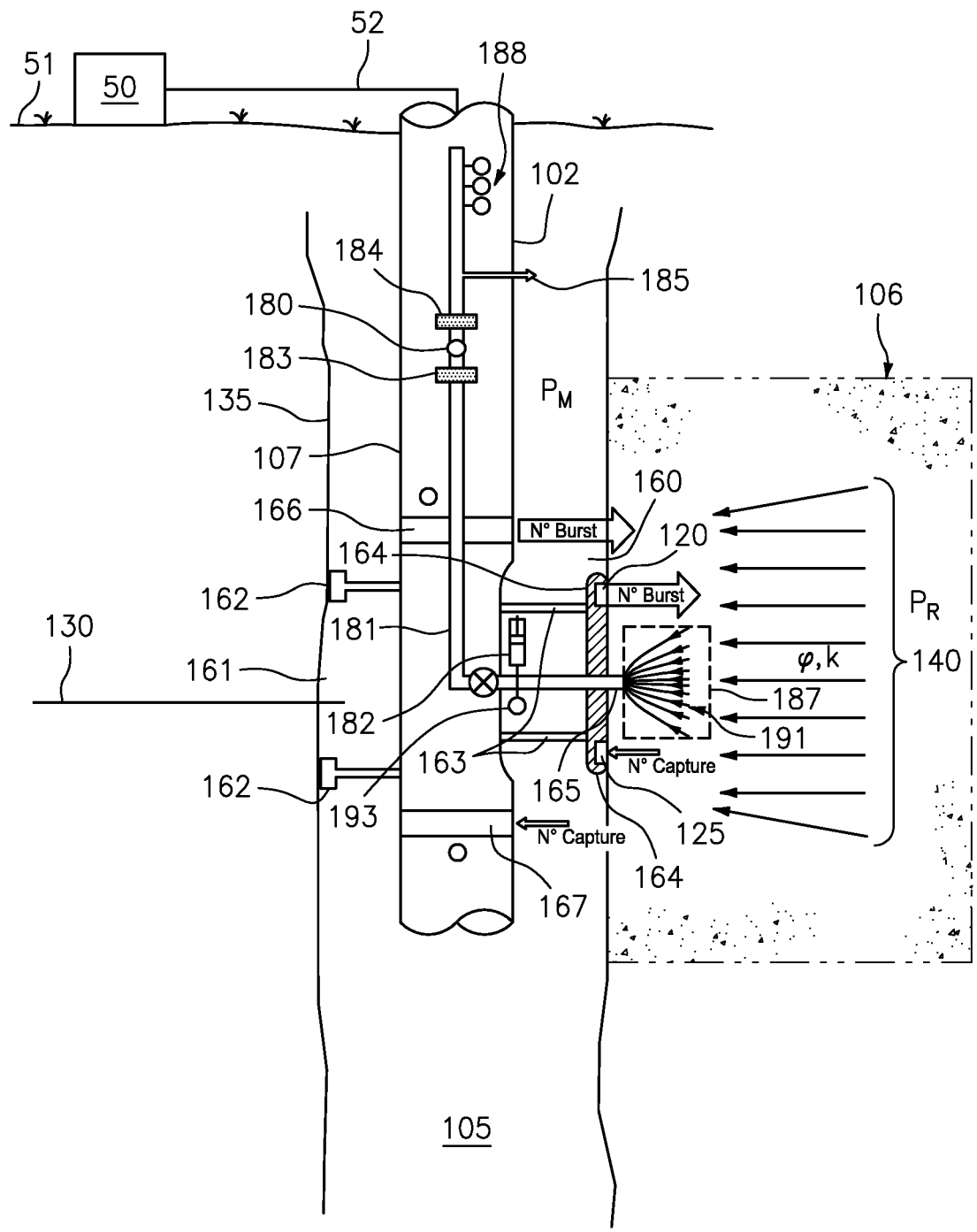
FIG. 1 illustrates a formation tester apparatus in accordance with certain aspects of the present disclosure.

Examples of Tools for Monitoring Saturation Changes in a Formation While Dynamically Flowing Fluids With reference to FIG. 1, there is shown an embodiment of a wireline formation tester 102 deployed within a well 105 drilled into formation 106 having a porosity φ and a permeability k. The well is shown as an open hole, however, the present invention is not limited to open hole wells and could, for instance, be used within a cased hole well with certain obvious modifications to the casing. In this particular embodiment, the formation tester 102 includes a positioning device comprising a clamping mechanism 161 that is urged against the borehole wall 135 by pistons 162 with shoes to stabilize the formation tester within the wellbore 105. The formation tester includes a fluid communication device comprising a probe assembly 160 having a pair of pistons 163 to urge the probe pad (or doughnut packer) 164 against borehole wall 135 with sufficient force to seal the area of the borehole wall 135 adjacent the pad and to releasably fix the formation tester in place. The probe and the pistons with shoes are three points that determine a plane so that the formation tool does not rotate or wobble in the preselected downhole position. The probe pad 164 further seals the formation 106 from the wellbore 105 in the area of contact. The probe 165 penetrates the borehole wall 135 and any mudcake that may exist adjacent thereto and enters the formation area 106. The probe 165 is in hydraulic communication with pump 180 mounted within the formation tester housing 107. The probe assembly may also include a guard ring (not shown) which may comprise a loop that encircles the ring and is hydraulically coupled to pump 180 mounted within the formation tester housing 107. An exemplary embodiment of a focused guard probe is disclosed in US Patent Number U.S. Pat. No. 6,301,959 to Hrametz, the contents of which is incorporated herein.

It is known in the art to provide a fluid (not shown to avoid confusion), sometimes referred to as a mud, within the wellbore to produce a pressure $P_M$ greater than the reservoir pressure $P_R$ to create an overbalanced condition and prevent formation fluid 140 from entering the wellbore. Because $P_M$ is greater than $P_R$, some of the mud enters the formation creating both a mudcake (solids from the mud) on the borehole wall 135 and a zone of formation fluid that is contaminated with the filtrate (fluid from the mud), also known as invasion fluid, in the formation 106 adjacent the borehole wall.

In operation, the formation tool 102 is lowered by wireline (not shown) to a nominal predetermined depth 130, the clamping mechanism 162 and probe assembly 160 are urged against the borehole wall 135, and the probe 165 penetrates into the formation 106. The formation tool further includes piston pretest module 182 which includes a pressure measurement device and a piston capable of extracting a sample of the formation fluid. Fluid is allowed to enter the hydraulic line 181, valve 190 is closed off, hydraulic line 181 and piston pretest module 182 draws a sample to determine the reservoir pressure and mobility using well-known techniques. Locating pretest module 182 close to the probe reduces internal storage volume and insures that formation fluid and pressure are accurately tested. With valve 190 open, pump 180 draws fluid through the probe 165 and may be stored within the tool or circulated back into the wellbore 106 via outlet 185. Fluid is pumped through probe 165 for a sufficient period of time to remove most, if not all, of the invaded fluid in the testing volume 187 near the probe 165 to obtain filtrate-free formation fluid 140. Using well-known techniques, fluid measurement modules 183 and 184 provide real time data to operators to assist in determining when the formation tester is substantially filtrate-free formation fluid 140. Such testing modules may include pressure sensors, optical analyzers, density analyzers, and other such known testing modules. Although shown as two discrete measurement modules, it is within the scope of the present invention to use any number of measurement modules positioned along hydraulic line 181. Once the formation fluids are being produced free of invaded fluid, pump 180 moves formation fluid to sample containers 188 for further evaluation using techniques that are well known in the industry. Sample containers 188 may also comprise carry bottles for carrying substances, such as EOR fluids, downhole with the formation tester as will be described more fully herein after. The position of bottles 188 in the various figures is for illustrative purposes only and may be mounted anywhere along hydraulic line 181 without deviating from the present invention.

The embodiment shown in FIG. 1 further includes a formation analysis module comprised of computer hardware 50 mounted at the surface 51 or in the tool (not shown), neutron generator source 120 to emit neutron energy and detector module 125 responsive to neutron energy responses from the formation. Neutron energy responses include gamma rays emitted as a result of neutron capture within the formation and within the detector itself as well as neutron capture within the detector causing ions to be created. Neutron generator source 120 and detector module 125 are shown mounted in probe pad 164 such that the source is located close to the wellbore wall 135, and in some embodiments may be in direct contact with the wall. Neutron generator source 120 may be a pulsed neutron generator that includes a linear accelerator to produce neutrons by fusing deuterium atoms (DD) which results in the formation of a He-3 ion and a neutron with a kinetic energy of approximately 2.5 MeV. Neutron generator source 120 may also comprise a linear accelerator to produce neutrons by fusing a deuterium and a tritium atom (DT) which results in the formation of a He-4 ion and a neutron with a kinetic energy of approximately 14.1 MeV. Such neutron generator sources are known in the industry and are available, complete or as components, from commercial sources such as Sodern SODILOG (sodern.com) and American High Voltage NT-100 kV (ahv.com). Although not shown, it is an important aspect of the present invention that alternative schemes for mounting source 120 are contemplated. As will be more fully described herein below, neutron generator source 120 may advantageously comprise a collimated source that emits a burst of neutrons that penetrate into formation 106 and specifically into and around testing volume 187. Detector module 125 detects radiation at least associated with thermal neutron capture events and either stores data of such events or communicates the data to a computing device 50 mounted on the surface 51 either wirelessly or via communications cable 52. Computing device 50 utilizes the data in modeling techniques and statistical analysis methods to produce a neutron sigma log versus time associated with the testing volume. The neutron sigma data are used to estimate and/or determine properties of the testing volume as will be more fully explained herein below. It will be understood that with modern computing power some of these computations may be performed with a computing device and storage medium (not shown) positioned within formation testing tool 102. The present invention includes probe pad mounted detection neutron generator source 120 and detector module 125 which benefits from being located closer to borehole wall 135 enabling the detectors of the present invention to be isolated from the borehole making de-convolution of the borehole effects from the reservoir effects less significant to accuracy and by capturing more information from the neutrons that enter the formation. Such proximity to the borehole wall may also allow a lower power source to be used. It is an aspect of the present invention that neutron generator source 120 and/or detector 125 are modular in design and may be easily installed and removed from the formation tester. In this particular embodiment, the formation tester and the neutron source and the detector may be transported separately between locations resulting in lower regulation and customs delays. In addition, while the positions of the source and detectors are shown in one configuration, the actual position and location of the source relative to the detector may be different in different embodiments as well as the number of sources and detectors without deviating from the present invention.

Shown in FIG. 1 is a second neutron generator source 166 mounted within the tester housing 107 and spaced apart from neutron generator source 120. As one skilled in the art can appreciate, the neutrons emitted from the two devices would interact differently with the formation and provide different information about the testing volume 187. Also shown is a second detection module 167 spaced apart from detection module 164. As one skilled in the art can appreciate, the detection modules would receive different information related to the neutron capture events and may function as a near (short-spaced) detector 164 and a far (long-spaced) detector 167, the far detector sensing the main results of neutrons interacting with the testing volume 187. It should be noted that these terms are relative and differ from prior art logging tools where the far detector senses deep into the formation. The position of the detectors 164 and 167 are selected such that the detectors sense neutron interaction within the testing volume 187. The detectors may be of gamma or neutron type and also may be included in combination. Such combinations may include such detectors as set forth in US Patent Application Number US20160154141 to Moake, wherein a single detector would detect both neutrons and gammas from the formation. In addition, multiple such dual use detectors may be used. A gamma detector such as based on a sodium iodide (NaI) scintillation crystal and photomultiplier is sensitive to gamma rays emitted by the capture of neutrons in the formation and by positioning and shielding, less so to the capture in the borehole. A neutron detector such as one based on $^3$He gas is sensitive to the arrival of neutrons from the formation or borehole, which are captured by $^3$He with the emission of ions that are detected as electrical charge. Such detectors are widely available from companies such as Saint Gobain (crystals.saint-gobain.com), Scionix (scionix.nl), and GE (gemeasurements.com). Both types of detector can advantageously be used simultaneously in that the gamma detector is very sensitive to neutrons captured within the formation by high-sigma constituents such as salt water; whereas the neutron detector is sensitive to neutrons that were slowed by gas but not captured. Detectors 164 and 167 will record counts versus time during and after the pulse or a succession of pulses from source 120. The counts will decline substantially as an exponential decay, where each constituent in the formation and borehole contributes to the decay, having regard to the quantity of said constituent as will be more fully described herein after. As is known, the details of the decay will vary with time. The sigma measurements of most relevance to the present invention are those determined from the later part of the decay curves and are due to thermal neutrons, i.e. those that have been greatly slowed by their interactions with the constituents of the formation through which the neutrons have travelled. Taking the logarithm of the counts in a later part of the decay curves generally leaves a straight line versus time, and the slope of this line is, apart from scaling, commonly termed the apparent sigma ($\Sigma_a$). It is possible by means such as are explained in the prior art, but in a tool-specific manner, to make corrections for the borehole effects and geometrical response in order to correct apparent sigma to intrinsic sigma ($\Sigma_{intrinsic}$). These prior art tools are not releasably fixed against the borehole wall. An ideally corrected intrinsic sigma is the sum of the sigmas of the constituents in the test volume 187 weighted by their fractional amounts. In the present invention, the conversion to intrinsic sigma may further include corrections for the size and shape of the cone of oil 191 that is drawn to the probe during pumping as discussed in detail herein below. Such corrections may be obtained by modeling and experimentation, and utilizing computing software, hardware and storage media and they may be performed within formation tester 102 or at the surface 51 on computer 50. As is known, the detector pulse outputs vary in amplitude according to the energy of the neutron capture. These count measurements, may be plotted in a histogram grouped according to the amplitude of the counts, which results in an energy spectrum, from which constituents of the formation can be further identified. Such further analysis and use of data provided by the present invention is contemplated. The spectrum obtained will differ according to the time window of collection. As an example, the measured spectrum of gamma emission due to inelastic scattering during the neutron bursts may reveal information on carbon and oxygen content which is valuable because of the relationship to hydrocarbon and water respectively. Neutrons that are slowed down by inelastic and inelastic scattering until they reach energies of 0.4 to 4 eV are termed epithermal neutrons and neutrons that slow due to less than 0.4 eV are termed thermal neutrons. As is known, the sigma measurement is based on thermal neutrons. As a further example of how the spectrum differs with respect to the time window of collection, the spectrum at later times may reveal information on mineral content such as aluminum (Al), which is valuable for identifying shale fraction in the test volume 187. Measurements of these types are difficult to obtain in prior art logging tools because the tools are moving in the borehole and have a relatively short time at each depth, reducing the number of recorded counts and hence having insufficient counts or too much statistical variation in the counts to extract all the potentially available information. In the present invention, the tool is stationary at a predetermined depth 130 and the counts may be accumulated in sufficient numbers for precise measurements, even with lower power neutron generators such as of the aforementioned DD type. In the case of aluminum, the capture of thermal neutrons puts it in an excited state that persists with a half-life of 2.3 minutes, emitting a 1.78 MeV gamma radiation. The nature of the present invention, which is stationary for protracted times, facilitates this measurement.

Figure 2:
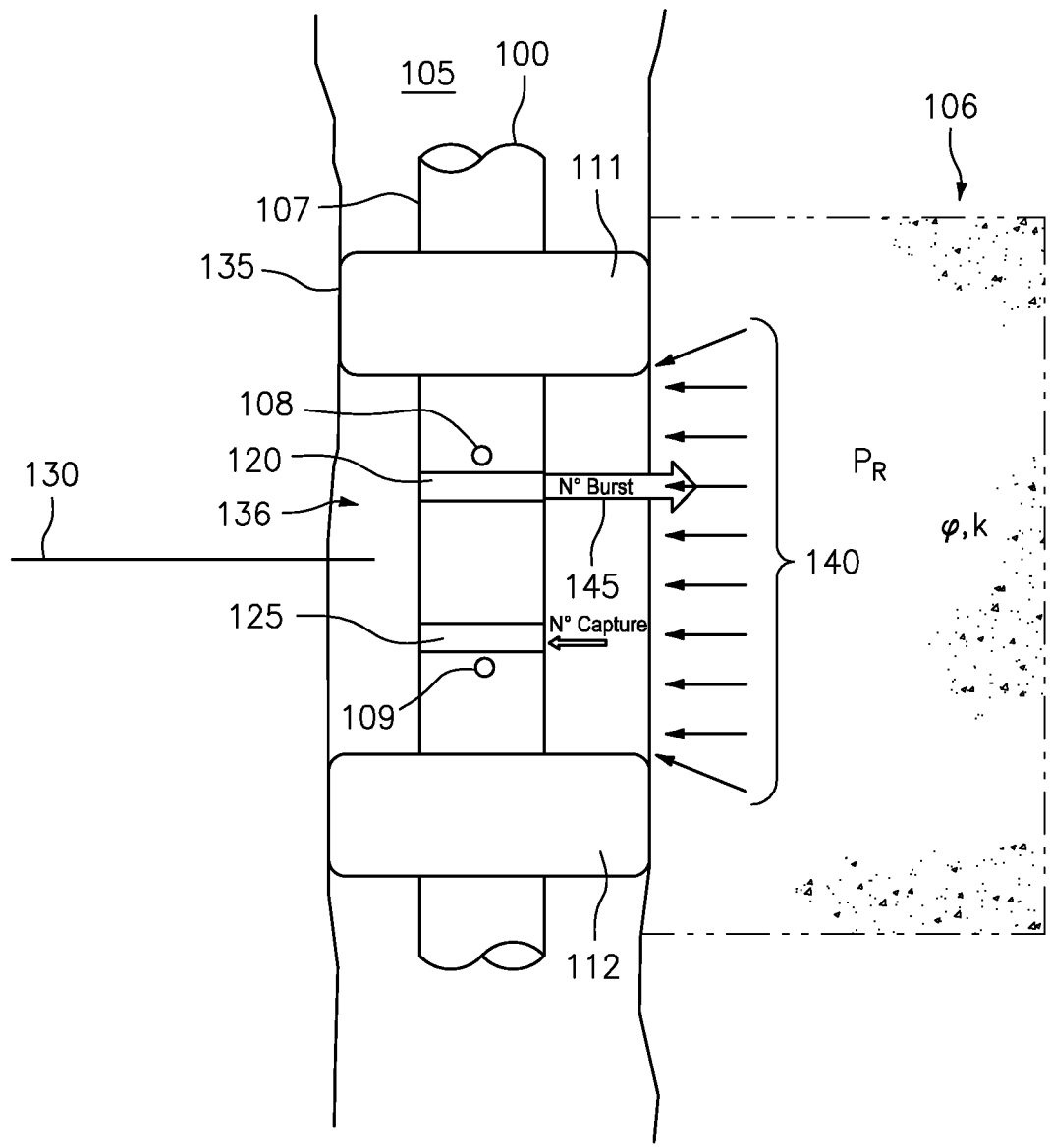
FIG. 2 illustrates a formation tester apparatus in accordance with certain aspects of the present disclosure.

FIG. 2 illustrates a wireline formation tester 100 deployed within a well 105 drilled into formation 106. The well is shown as an open hole however, the present invention is not limited to open hole wells and could, for instance, be used within a cased hole well with obvious modifications being made to the casing. In the embodiment shown, the formation tester 100 includes a pair of spaced apart inflatable straddle packers 111 and 112 similar to that found in the prior art, which may representatively be 1 meter wide. The formation tester further includes at least one neutron generator source 120 and at least one detector module 125 mounted within the formation tester tool and positioned between the straddle packers. Neutron generator source 120 may be a pulsed neutron generator similar to that described herein above with reference to FIG. 1. Although not shown, it is an important aspect of the present invention that alternative schemes for mounting source 120 and detector 125 are contemplated. For example, neutron generator source 120 and detector module 125 may be mounted on extensible pistons to position the source and detector module outside of the body 107 of formation testing tool 100 and closer to the borehole wall 135 including in contact with the borehole wall. In operation, the formation tool 100 is lowered by wireline (not shown) to a nominal predetermined depth 130 and the straddle packers are inflated with drilling mud or a gas, or mechanically expanded, as is known, to come into contact with the wellbore wall 135 and the formation tester housing 107 and seal off the volume 136 formed there between. Pumps within the formation tester (not shown) evacuate at least some of the fluid that may be present in volume 136 through ports 108 and 109 in a manner well known in the industry creating a pressure within the volume 136 that is less than the reservoir pressure $P_R$. The difference in pressure causes the formation fluid, indicated by arrows 140, to flow into the volume 136. In operation, formation tester 100 functions similar to that of formation tester 101 of FIG. 3? described immediately herein after.

Figure 3:
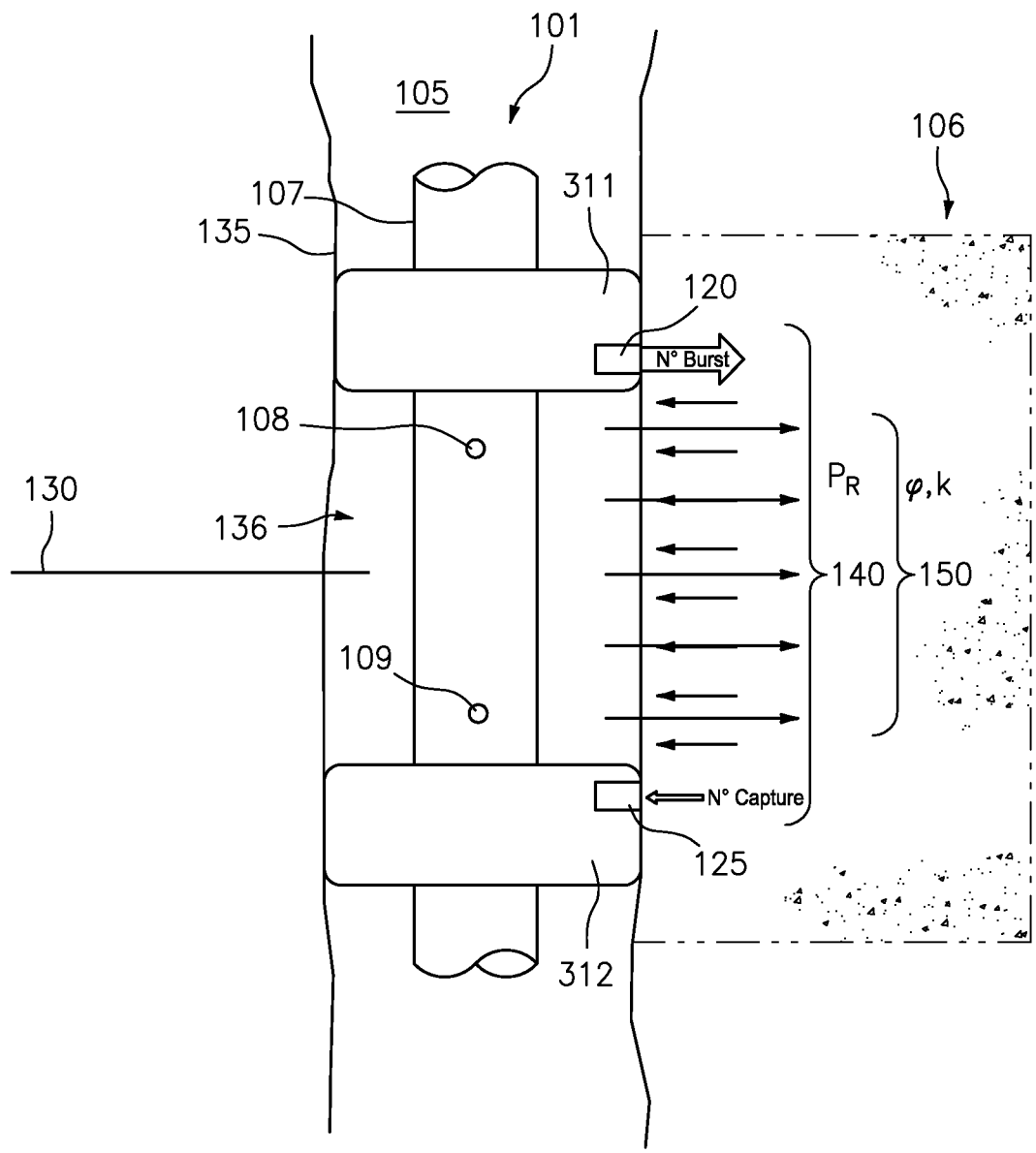
FIG. 3 illustrates a formation tester apparatus in accordance with certain aspects of the present disclosure.

With reference to FIG. 3 there is shown another embodiment of a wireline formation tester 101 deployed within a well 105 drilled into formation 106. In this particular embodiment of the present invention, the neutron generator source and detector modules are mounted within the straddle packers. It should be stressed that the combination of features, uses and materials amongst the various embodiments described herein is contemplated by the present invention. In this particular embodiment, the formation tester 101 includes a pair of spaced apart inflatable straddle packers 311 and 312. At least one neutron generator source 120 is mounted within packer 311 and at least one detector module 125 is mounted within packer 312. In operation, the formation tool 101 is lowered by wireline (not shown) to a nominal predetermined depth 130 and the straddle packers are inflated to come into contact with the wellbore wall 135 and the formation tester housing 107 and seal off the volume 136 formed there between. Pumps within the formation tester (similar to pump 180 in FIG. 1) evacuate at least some of the fluid that may be present in volume 136 through one or both ports 108 and 109 in a manner well known in the industry creating a pressure within the volume that is less than the reservoir pressure $P_R$. The difference in pressure causes the formation fluid, indicated by arrows 140, to flow into the volume 136. With the neutron generator source 120 mounted in packer 311, the source is located close to the wellbore wall 135, and in some embodiments may be in direct contact with the wall, neutrons from the generator are able to penetrate further into formation 106 with a less powerful source than would otherwise be necessary if mounted on the tool housing 107. Similarly, detection module 125 is located close to borehole wall 135 enabling the detectors of the present invention to capture more information from the neutrons that enter the formation.

Also shown in FIG. 3 is the ability of the present invention to advantageously inject enhanced oil recovery (EOR) test materials indicated by the group of arrows 150 into the formation through one or both of the ports 108 and 109 and in some cases to subsequently pump out formation fluid for investigation of its properties. The ports 108 and 109 of the embodiment of FIG. 3 are shown for illustrative purposes and may vary in number, shape, or location about the housing 107. The present invention enables the real time evaluation of the effects of various EOR substances on the formation in that the embodiment of FIG. 3 pumps fluids into the reservoir while acquiring neutron sigma to produce saturation versus time data for each such fluid or gas. Any number of EOR substances, as enumerated elsewhere herein, may be utilized to determine their effect on enhancing the oil recovery from reservoir 106. Such EOR substances may be transported as described with reference to embodiments described elsewhere herein. Alternatively, the EOR fluid may be staged (spotted) in the wellbore at and around depth 130 so that the drilling mud does not invade the formation before the EOR substances. In operation, the formation tool 101 is lowered by wireline (not shown) to a nominal predetermined depth 130 and the packers 311 and 312 are urged against the borehole wall 135. Prior to the introduction of EOR substances 150, the invaded fluid is evacuated from the formation 106 between packers 311 and 312. In this particular embodiment, the annular space between the packers comprises the testing volume. To remove invaded fluid from the testing volume, fluid from the testing volume is allowed to enter tool 101 through one or both of the ports 108 and 109. Fluid is pumped through ports 108 and 109 for a sufficient period of time to remove most, if not all, of the invaded fluid in the testing volume between packers 311 and 312 to obtain formation fluid 140. Using well-known techniques, testing modules similar to 183 and 184 of FIG. 1 provide real time data to operators to assist in determining when the formation tester is producing filtrate-free formation fluid 140. The EOR substances can then be injected through one or both of the ports 108 and 109 as depicted by arrows 150 and enter the testing volume of the formation 106. The effectiveness of the EOR substances may then be analyzed as will be more fully described herein after with reference to other embodiments. The neutron generator 120 is pulsed according to a schedule and detector 125 is utilized to determine the intrinsic sigma and analyze it for various constituents as will be more fully described herein after. This sigma detection may be a continuous or semi-continuous process during the draw down, clean up, sampling, and injection phases of testing.

Figure 4:
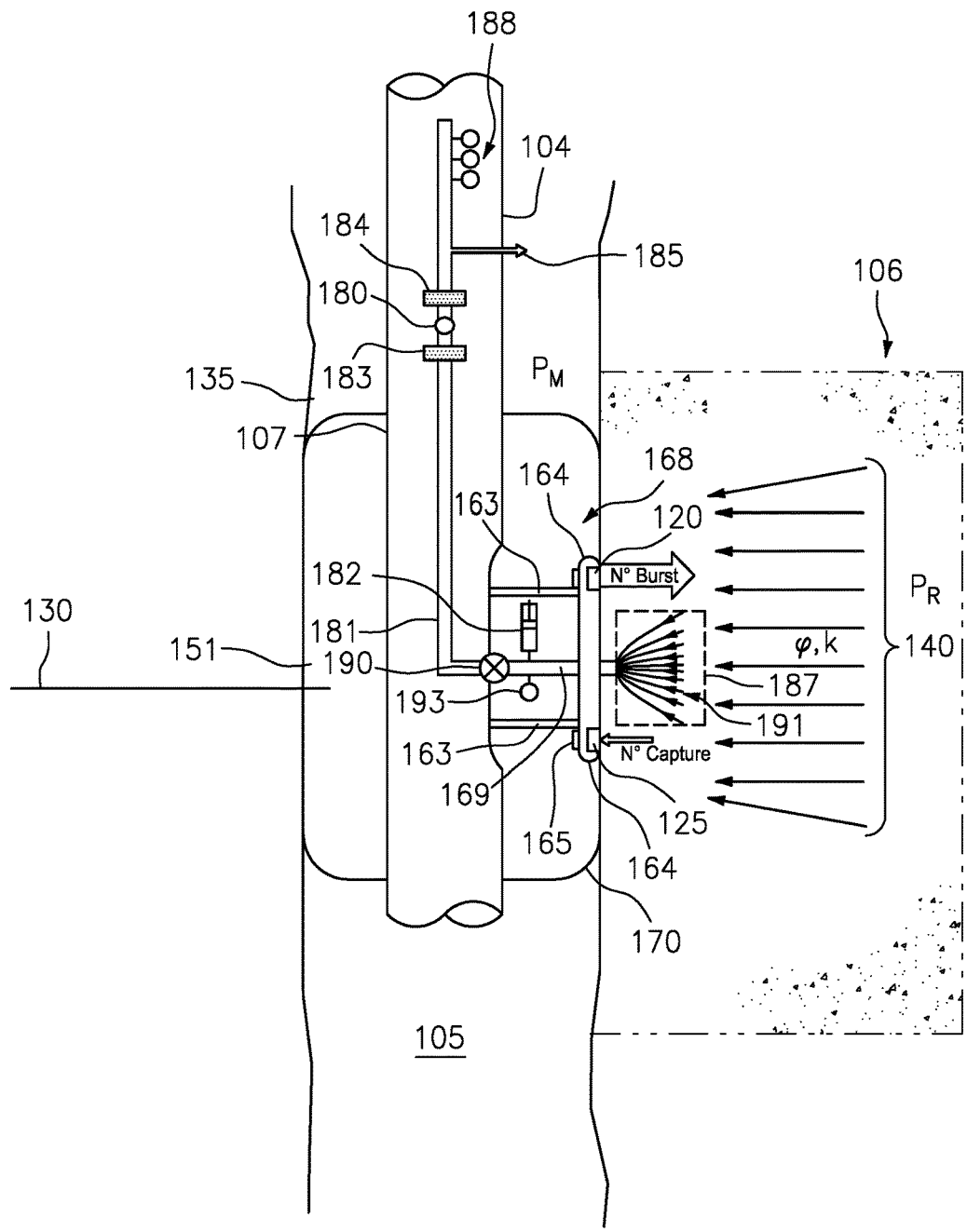
FIG. 4 illustrates a formation tester apparatus in accordance with certain aspects of the present disclosure.

Now with reference to FIG. 4 there is shown an embodiment of a wireline formation tester 104 deployed within a well 105 drilled into formation 106 having a porosity φ and a permeability k. The well is shown as an open hole however, the present invention is not limited to open hole wells and could, for instance, be used within a cased hole well. In this particular embodiment, the formation tester 104 includes a single packer 151 that, when inflated with drilling mud, nitrogen or the like, or mechanically expanded, surrounds and seals against housing 107 and borehole wall 135 to stabilize the formation tester within the wellbore 105. Packer 151 includes a cavity (not shown) and formation tester 104 includes a probe assembly 168 having a pair of pistons 163 to urge the probe assembly against packer wall 170 within the cavity and further to drive probe 165 through the mudcake and into the formation 106. Although shown as having a separate mechanism to urge the probe assembly toward the formation, the present invention includes any such arrangement that would position the probe assembly adjacent to the formation with the probe penetrating into the formation. The packer 151 seals the formation 106 from the wellbore 105 in the area of contact and in the embodiment shown seals formation 106 between the top and bottom of the packer. The probe 165 penetrates the borehole wall 135 and any mudcake that may exist adjacent thereto and enters the formation area 106. The probe 165 is in hydraulic communication with pump 180 mounted within the formation tester housing 107. While only one pair of source/detector is shown, the present embodiment may comprise multiple sources and detectors located within the packer or outside of the packer and mounted to the housing of the formation tester FDT.

In operation, the formation tool 104 is lowered by wireline (not shown) to a nominal predetermined depth 130, the packer 151 surrounds the body of formation tester 104 and is inflated to come into contact with borehole wall 135 and provide a seal there between. Pistons 163 extend probe assembly against packer wall 170 and probe 165 penetrates into the formation 106. Fluid line 169 is expandable (telescoping, flexible, or otherwise) and provides for fluid communication between the probe 165 and the hydraulic line 181. Formation tester 104 functions similar to that described herein above and below.

Figure 5:
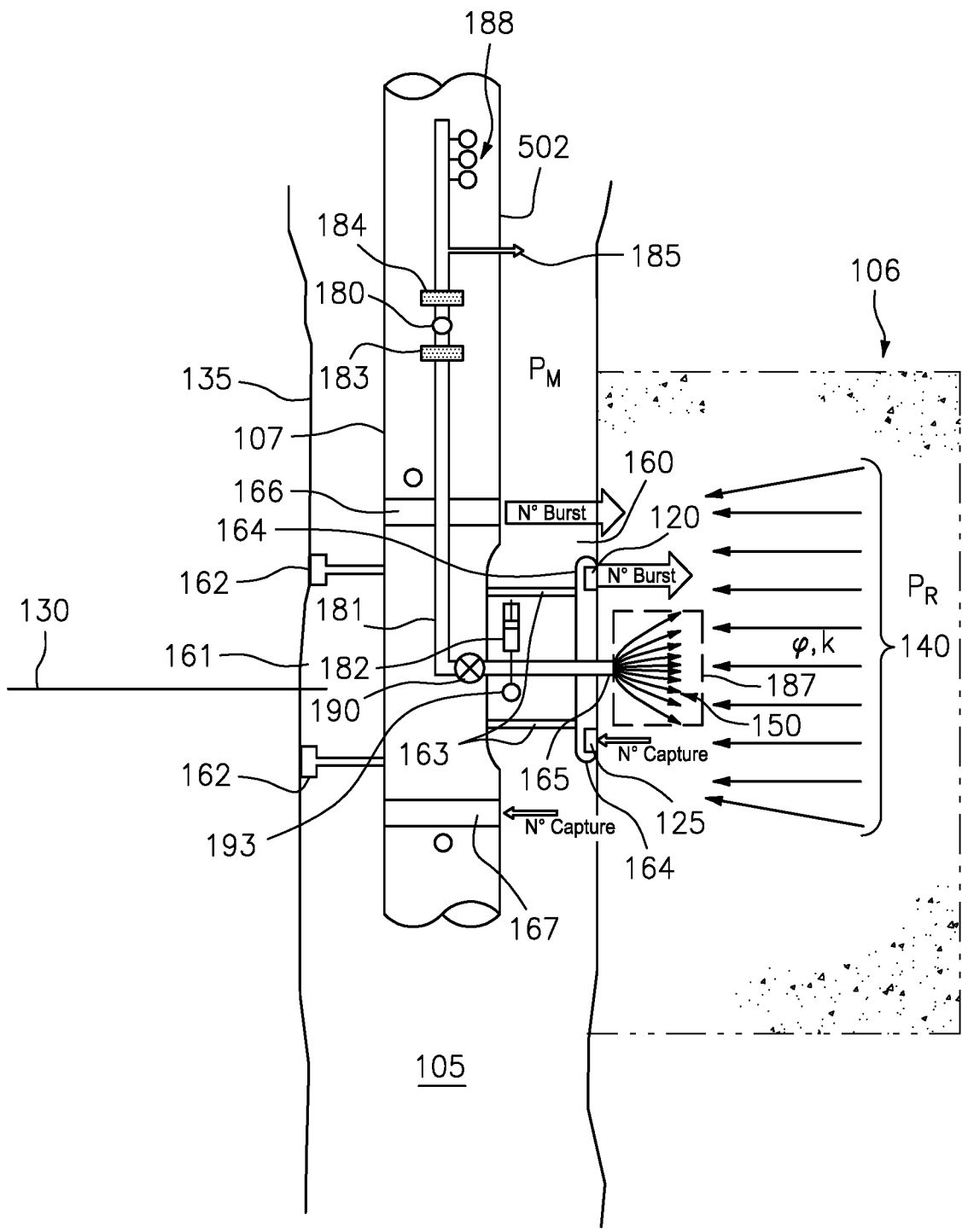
FIG. 5 illustrates a formation tester apparatus in accordance with certain aspects of the present disclosure.

Now with reference to FIG. 5, there is shown yet another embodiment of a wireline formation tester 502 deployed within a well 105 drilled into formation 106. In this particular embodiment, the formation tester 502 includes a clamping mechanism 161 that is urged against the borehole wall 135 by pistons 162 to stabilize the formation tester within the wellbore 105. The formation tester includes a probe assembly 160 having a pair of pistons 163 to urge the probe pad (or doughnut packer) 164 against borehole wall 135 with sufficient force to releasably fix the formation tester in place. The probe and the pistons with shoes are three points that determine a plane so that the formation tool does not rotate or wobble in the preselected downhole position. The probe pad 164 further seals the formation 106 from the wellbore 105 in the area of contact. The probe 165, in some instances, penetrates the borehole wall 135 and any mudcake that may exist adjacent thereto and enters the formation area 106. The probe 165 is in hydraulic communication with pump 180 mounted within the formation tester housing 107.

As is known in the prior art, in some cases, such as formations comprising rock or shale, probe 165 may not penetrate into the formation but will nonetheless be in hydraulic communication with the formation. The probe assembly may also include a guard ring (not shown) which may comprise a loop that encircles the ring and is hydraulically coupled to pump 180 mounted within the formation tester housing 107 or to another pump for this purpose (not shown).

In the embodiment shown in FIG. 5, neutron generator source 120 and detector module 125 are shown mounted in probe pad 164 such that the source is located close to the wellbore wall 135, and in some embodiments may be in direct contact with the wall. Neutron generator source 120 may be a pulsed neutron generator as described herein above with reference to FIG. 1. Although not shown, it is an important aspect of the present invention that alternative schemes for mounting source 120 are contemplated. Detector module 125 detects radiation at least associated with neutron capture events and either stores data of such events or communicates the data to a computing device 50 mounted on the surface 51 either wirelessly or via communications cable 52. Computing device 50 utilizes the data in modeling techniques and statistical analysis methods to produce a neutron sigma log versus time associated with the testing volume. The neutron capture data are used to estimate properties of the testing volume as will be more fully explained herein below.

The embodiment of FIG. 5 further comprises the ability to advantageously inject enhanced oil recovery (EOR) test substances 150 into the formation through probe 165. Such EOR substances include ASP (alkali-surfactant-polymer), water, acid, miscible gas, $CO_2$, disposal fluids, $H_2S$, proppant, drill cuttings, other known substances and mixtures/combinations thereof for testing their effects on various parameters of the formation. The present invention enables the real time evaluation of the effect of various EOR substances on the formation in that the FDT pumps said substances into the reservoir while acquiring neutron sigma and potentially using it to produce saturation versus time data for each such substance. The substances may further be pumped back out for further analysis as described herein after. Any number of EOR substances may be utilized to determine their effect on enhancing the oil recovery from reservoir 106. Such substances 150 are carried downhole in the tester 502 in suitable containers 188 or by other known techniques such as coiled tubing conveyed systems and delivered by pump 180 into formation 106 via probe 165. In operation, the formation tool 502 is lowered by wireline (not shown) to a nominal predetermined depth 130 and the clamping mechanism 162 and probe assembly 160 are urged against the borehole wall 135. In some cases, prior to the introduction of EOR substances 150, the invaded fluid is evacuated from the volume 187. To remove invaded fluid from the testing volume 187, fluid from the testing volume is allowed to enter the hydraulic line 181. The formation tool further includes piston pretest module 182 which includes a pressure measurement device and a piston capable of extracting a sample of the formation fluid. Fluid is allowed to enter the hydraulic line 181, valve 190 is closed off, hydraulic line 181 and piston pretest module 182 draws a sample to determine the reservoir pressure and mobility using well-known techniques. Locating pretest module 182 close to the probe reduces internal storage volume and insures that formation fluid and pressure are tested. With valve 190 open, pump 180 draws fluid through the probe 165 and may store the fluid within the tool or circulates at least some of the fluid back into the wellbore 106 via outlet 185. Fluid is pumped into probe 165 from testing volume 187 for a sufficient period of time to remove most, if not all, of the invaded fluid in the testing volume 187 near the probe 165 to obtain formation fluid 140. Using well-known techniques, testing modules 183 and 184 provide real time data to operators to assist in determining when the formation tester is producing substantially filtrate-free formation fluid 140. Such testing modules may include pressure sensors, optical analyzers, density analyzers, and other such known testing modules. Once the formation fluids are being produced sufficiently free of invaded fluid, pump 180 may move formation fluid to sample containers 188 for further evaluation using techniques that are well known in the industry. The EOR substances can then be injected and analyzed as will be more fully described herein after, whereas EOR substances injected prior to cleaning up will invalidate several of these analyses.

Also shown in FIG. 5 is a second neutron generator source 166 mounted within the tester housing 107 and spaced apart from neutron generator source 120. As one skilled in the art can appreciate, the neutrons emitted from the two devices would interact differently with the formation and provide different information. Also shown is a second detection module 167 spaced apart from detection module 164. As one skilled in the art can appreciate, the detection modules would receive different information related to the neutron events and would at least function as near (short-spaced) 164 and far (long-spaced) 167 detectors.

Figure 6:
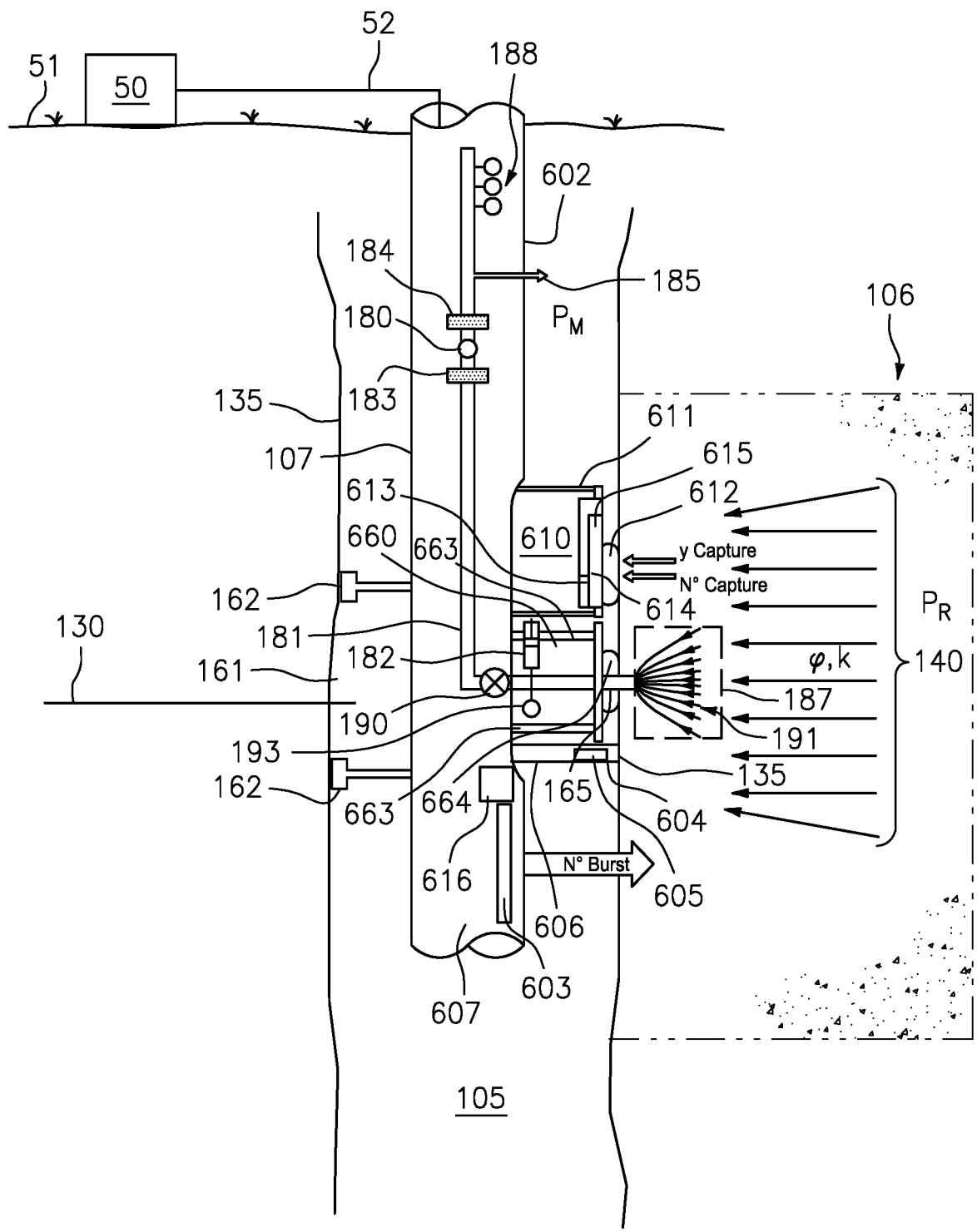
FIG. 6 illustrates a formation tester apparatus in accordance with certain aspects of the present disclosure.
Figure 7:
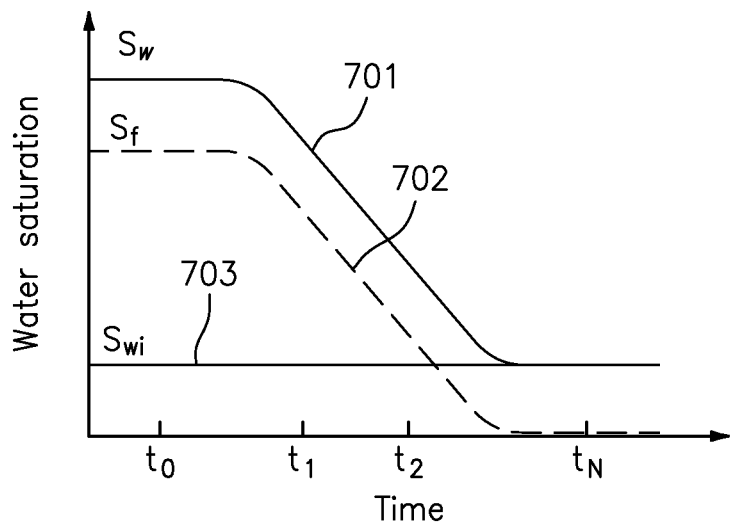
FIG. 7 is a graphical representation of water saturation versus time in accordance with certain aspects of the present disclosure.

Now with reference to FIG. 6, there is shown yet another embodiment of a wireline formation tester 602 deployed within a well 105 drilled into formation 106. In this particular embodiment, the formation tester 602 includes a clamping mechanism 161 that is urged against the borehole wall 135 by pistons with shoes 162 to stabilize the formation tester within the wellbore 105. The formation tester 602 includes a probe assembly 660 having a pair of pistons 663 to urge the probe pad (or doughnut packer) 664 against borehole wall 135 with sufficient force to releasably fix the formation tester 602 in place. The probe and the pistons with shoes are three points that determine a plane so that the formation tool does not rotate or wobble in the preselected downhole position. The probe pad 664 further seals the formation 106 from the wellbore 105 in the area of contact. The probe 165 penetrates the borehole wall 135 and any mudcake that may exist adjacent thereto and enters the formation area 106. The probe 165 is in hydraulic communication with pump 180 mounted within the formation tester housing 107. The probe assembly may also include a guard ring (not shown) which may comprise a loop that encircles the ring and is hydraulically coupled to pump 180 mounted within the formation tester housing 107.

Still referring to FIG. 6, formation tester 602 includes neutron generator source 603 shown mounted within the body 607 of the tool. Neutron generator source 603 may be a pulsed neutron generator similar to that described herein above with reference to FIG. 1. Although not shown, it is an important aspect of the present invention that alternative schemes for mounting source 603 are contemplated. For example, neutron generator source 603 may be mounted on an extensible piston to position the source outside of the formation testing tool 602 and closer to the borehole wall 135 including in contact with the borehole wall.

Formation tester 602 further includes neutron detector module 604, which comprises near neutron detector 605 and hydraulic piston 606. Neutron detector 605 may comprise a helium neutron detector (or $^3$He detector). $^3$He is an isotope of Helium and provides for an effective neutron detector material because $^3$He reacts by absorbing thermal neutrons returning from the testing volume 187 in formation 106, and converting to ions of tritium $^3$H and protium 41; the resulting electric charge is measured at the detector output. Advantageously, its sensitivity to gamma rays is negligible, thereby making it an effective neutron detector. Neutron detector 605 may also be comprised of a scintillation neutron detector such as a sodium iodide (NaI) crystal scintillator and photomultiplier. Such detectors are known in the industry and may be available from Saint Gobain (saint-gobain.com). It should be appreciated by those skilled in the art that neutron detector 605 is extended from body 607 and positioned against borehole wall with sufficient force to penetrate at least some of the mudcake. The force exerted by piston 606 is sufficient to ensure good contact between neutron detector assembly 604 and the mudcake on borehole wall 135. However, the force exerted by piston 606 is small enough so as to not significantly reduce the contact force of the probe pad 664 since the probe pad needs to maintain a seal between borehole pressure $P_M$ and the reservoir pressure $P_R$ at the probe 165, the difference of which in some cases can attain several thousand pounds per square inch. In certain embodiments, a resilient elastomer may be affixed to each detector carrier so as to make a more effective fluid excluder at the borehole wall 135. However, it is a well-known hazard of forcing a part into contact with the mudcake that the aforementioned difference in borehole and formation pressures will appear across the part and may result in great hydraulic force, making it difficult to retract the part and leaving the tool stuck in the hole. An alternative embodiment also includes a compressible packing, such as a wire mesh affixed to the end of sensor assembly 604, that will compress against the borehole wall excluding most borehole fluid while leaving small passageways for borehole fluids which prevent the pressure differential developing over a large area. Cutting deep grooves into the detector housings is another means of reducing contact area and hence differential force, but this will allow significant borehole fluid into the grooves. As discussed herein above, positioning detector assembly 604 against the borehole wall 135 enables the detectors of the present invention to be isolated from the borehole making it less sensitive to borehole effects and capturing more information from the neutrons that enter the formation. Neutron detector 606 detects radiation at least associated with neutron capture events, and expresses such events in capture units or c.u., and either stores data of such events or communicates the data to a computing device, either within the formation testing tool 602 or computing device 50 mounted on the surface 51, either wirelessly or via communications cable 52. Detection software hosted within the tool or on computing device 50 includes analysis tools that perform tasks such as graphical analysis to measure the number and energies of neutrons striking the detector as will be more fully described herein after. Computing device 50 may utilize the data in the analysis tools to produce a neutron sigma log versus time associated with the testing volume.

Detector assembly 610 further includes gamma ray detector 614 and photomultiplier 615. Gamma ray detector 614 may comprise a gamma scintillator for detecting and measuring ionizing radiation by using the excitation effect of radiation from source 603 incident on the testing volume 187 on a scintillator material, and wherein photomultiplier 615 detects the resultant light pulses. The scintillator of detector 614 generates photons in response to the incident radiation, and photomultiplier 615 converts the light to an electrical signal that is sent to computer 50 to process this signal. Gamma ray detector may comprise a sodium iodide (NaI) type detector that is similar to those that are offered for sale by various manufacturers including Saint-Gobain, Scionix and Hamatsu. The scintillators of detector 614 may comprise an organic crystal, organic liquid, plastic, inorganic crystal, gaseous, glass, or other known scintillator suitable for use at the typically high downhole temperatures.

In addition, and still with reference to FIG. 6, the present invention further includes absorber 616 positioned within the body 607 of formation tester 602 and between source 603 and detector 605. Absorber 616 may be comprised of a boron material and acts a filter to prevent neutrons from source 603 directly impinging upon detector 605. In this way, absorber 616 ensures that detector 605 only captures neutrons that have interacted with, and contain information about, the testing volume 187. It is also within the scope of the present invention that the detectors may be further shielded, for example, by a suitable coating or housing, in order to prevent absorption of neutrons from outside of the testing volume 187.

It is an aspect of the present invention that neutron generator source 603 and detectors 605, 612 and 613 are modular in design and may be easily installed and removed from the formation tester. In this particular embodiment, the formation tester and the neutron source and detector pair may be transported separately between locations resulting in lower regulation and customs delays. In addition, while the positions of the source and detector pairs are shown in one configuration, the actual position and location of the source relative to the detector may be different in different embodiments as well as the number of sources and detectors without deviating from the present invention.

Figure 11:
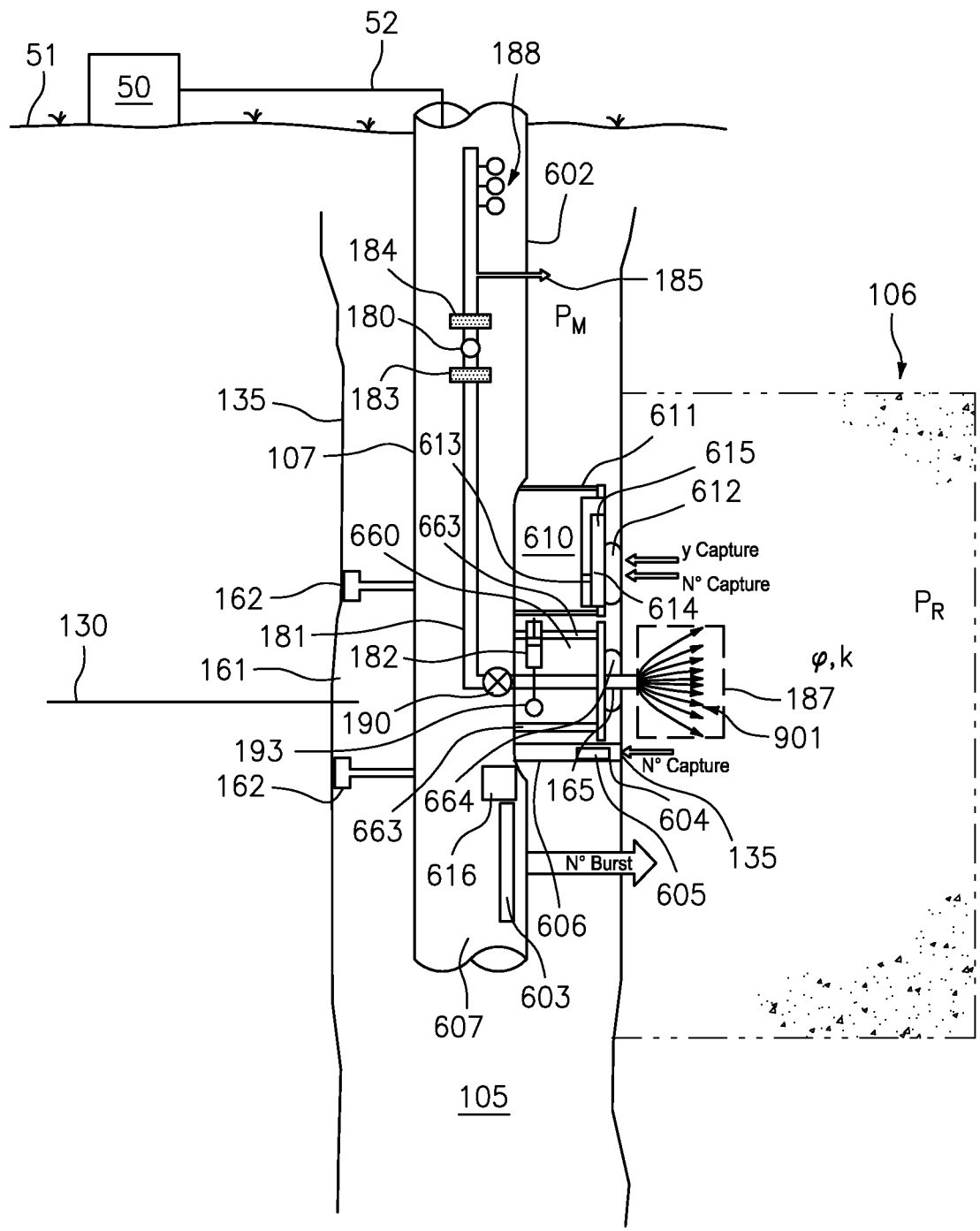
FIG. 11 illustrates a formation tester apparatus in accordance with certain aspects of the present disclosure.

Also with reference to the embodiment of FIG. 6, the present invention possesses the ability to advantageously inject enhanced oil recovery (EOR) test substances into the formation through probe 165. Such EOR substances include ASP (alkali-surfactant-polymer), water, acid, miscible gas, $CO_2$, disposal fluids, $H_2S$, and other known substances for testing their effects on various parameters of the formation. The present invention enables the real time evaluation of the effect of various EOR substances on the formation in that the FDT pumps fluids from the reservoir while acquiring at least sigma data to produce saturation versus time data for each such fluid or gas. Any number of EOR substances may be utilized to determine their effect on enhancing the oil recovery from reservoir 106. Such EOR materials may include substances present in the borehole or may be carried downhole in the tester 602 in suitable containers 188 and delivered by pump 180 into formation 106 via probe 165 or by other known techniques such as coiled tubing conveyed systems. In operation, the formation tool 602 is lowered by wireline (not shown) to a nominal predetermined depth 130 and the clamping mechanism 162 and probe assembly 660 are urged against the borehole wall 135. Preferably, prior to the introduction of EOR materials the invaded fluid is evacuated from the volume 187. To remove invaded fluid from the testing volume 187, fluid from the testing volume is allowed to enter the hydraulic line 181. The formation tool further includes piston pretest module 182 which includes a pressure measurement device and a piston capable of extracting a sample of the formation fluid. Fluid is allowed to enter the hydraulic line 181, valve 190 is closed off, hydraulic line 181 and piston pretest module 182 draws a sample to determine the reservoir pressure and mobility using well-known techniques. Locating pretest module 182 close to the probe reduces internal storage volume and insures that formation fluid and pressure are accurately tested. With valve 190 open, pump 180 draws fluid through the probe 165 and circulates at least some of the fluid back into the wellbore 106 via outlet 185. Fluid is pumped through probe 165 for a sufficient period of time to remove most, if not all, of the invaded fluid in the testing volume 187 near the probe 165 to obtain formation fluid 140. After sufficient pumping, the fluid within test volume 187 will be comprised mostly of formation fluid 140 and will form an oil cone 191. Using well-known techniques, testing modules 183 and 184 provide real time data to operators to assist in determining when the formation tester is producing filtrate-free formation fluid 140. Such testing modules may include pressure sensors, optical analyzers, density analyzers, and other such known testing modules. Once the formation fluids are being produced free of invaded fluid, pump 180 may move formation fluid to sample containers 188 for further evaluation using techniques that are well known in the industry. During the clean out process, source 603 and detector modules 605 and 610 may be used to monitor the process in real time as will be more fully described herein below. The EOR substances can then be injected. The volume and rate of the fluid being injected is monitored by sensors (as shown in FIG. 11) in the formation tester 602 or by internal measurement within the pump such as piston stroke accumulation versus time. Source 603 and detector modules 605 and 610 may be used to analyze the effectiveness of the EOR substances as will be more fully described herein after.

It is an important aspect of the present invention that the selection and position of the excitation source and detectors enables the three-dimension modeling of fluids and the associated saturation values of the fluids and formation, within the testing volume, in real time. Heretofore, there has been no ability to determine these values due to the fact that there were always more unknowns than equations making the solution undetermined. It is also an important element of the present invention that the position of the formation testing tool 602 remains fixed at known position during the entire excitation and capture process. The excitation source 603 and sensors 605, 613 and 614 of the present invention are advantageously arranged in a fixed position relative to the borehole and targeted at the testing volume 187 during the evaluation process. The selection, position, and orientation of source 603 in relation to detectors 605, 613, and 614 in further relation to probe 165, among other elements of the present invention, eliminates a number of the variables and makes for a determinate solution as will be more fully explained herein after.

Example Methods of Employing Tools Monitoring Saturation Changes in a Formation While Dynamically Flowing Fluids An exemplary method of employing the FDT of the present invention is best described with reference to the embodiment described in FIG. 6. It should be appreciated by those skilled in the art that any of the embodiments described and taught herein could be employed in a similar manner without deviating from the scope of the present invention. An area of the formation 106 having a reservoir pressure $P_R$, a porosity cp, and permeability k is selected for testing in accordance with methods well known by those in the industry at a predetermined depth 130. The testing volume 187 can contain gas, water, oil, or an EOR substance (described herein after). Conventional methods are utilized to determine certain parameters of the formation as described herein above with reference to the various embodiments. As described herein above, probe assembly 660 is extended by piston pair 611 such that doughnut packer 664 seals against borehole wall 135 and probe 165 penetrates the mudcake and enters the testing volume 187 of interest. As described herein above, draw down piston 182 and valve 190 cooperate to determine the reservoir pressure and mobility. Valve 190 alternatively cooperates with the pump 180 to enable fluid to be withdrawn from or injected into testing volume 187 continuously or intermittently. It should be noted that although the embodiment shows a single pump 180 that may comprise a reversible pump, it is within the scope of the present invention that multiple pumps may be included. The neutron generator is pulsed according to a schedule and detectors 605, 613 are utilized to determine the sigma for various constituents as will be more fully described herein after. This sigma detection may be a continuous or semi-continuous process during the draw down, clean up, sampling, and injection phases of testing.

The method of employing the FDT of the present invention can be described in terms of idealized (albeit generally accepted by those skilled in the art) relationships, which follow directly herein below giving clarity to the present invention. The example method of employing the present invention herein above is directed at the use of water-based mud (WBM), whose filtrate is largely water. Example methods of employing the present invention directed at the use of oil-based mud (OBM) are described more fully herein after. It is within the scope of the present invention that as the methods are refined by future theory and practice, the various approximations may be improved upon. As an example, the formation porosity may be assumed to be constant in the following explanation of the invention but if there are large pressure changes during pumping causing mechanical stress to vary, the porosity may change. Epithermal neutrons may be detected by the detectors of the present invention at an earlier time than the thermal neutrons used for the sigma measurement. Analysis of the epithermal counts permits porosity to be estimated in a manner known in the art without knowing the water chlorine content. If thermal neutrons are used for this purpose, then because of their chlorine sensitivity, porosity becomes another unknown and may be found by substitution and other methods as set forth in the examples herein below. It is an aspect of the present invention that the stability of the porosity estimate yielded by methods described herein may be used as a quality control check. Further, it is within the scope of the present invention that changes in tool configuration and modeling may enhance the FDT's sigma geometrical response, for example, measuring the in situ change in porosity with change in pressure, and iteration of approximately known quantities such as the sigma of the reservoir hydrocarbon, to better match the total amount of gathered data.

The present invention measures, among other things, the apparent sigma or the sigma measurement as seen by the tool. The apparent sigma is the neutron measurement as a result of neutrons from the source interacting with the formation and fluids therein over a volume of investigation (testing volume 187) near to the surface of the borehole wall 135. In some embodiments of the present invention, the volume of investigation extends about 150 mm past the borehole wall 135. Basic modeling of tool response may assume a homogenous porous solid matrix. The apparent sigma may be converted to intrinsic sigma, wherein the borehole effects are compensated for, and at each time of pumping to and from the formation, it may be further corrected for the size and fluid distribution within the oil cone 191 in the case of pumping and the EOR cone 150 (FIG. 5) in the case of injection.

As described herein above, and during the course of the measurements being made with the present invention, oil is drawn through the invaded zone to the probe or region straddled by packers, leaving a spatially inhomogeneous distribution of fluids. As described below, after sufficient time the distribution will expand and may become uniform within the testing volume 187, i.e. over the most sensitive part of the tool volume of investigation. In this manner, the apparent sigma will be a measure in the testing volume over time. In some cases, such as when a probe is used as the conduit for pumping fluid, more extensive modeling and corrections would be required to extract an intrinsic sigma value for use in the following simplified equations. However, certain embodiments of the present invention minimize some of the modeling and corrections, such as by placing the detectors in contact with the borehole wall as described herein above.

What follows immediately herein below is but one example of a method to obtain saturation values using the present invention. Other methods of obtaining saturation values as well as other petrophysical parameters are within the scope of the present invention. For example, resistivity tool responses could be written in terms of the salinities and fractions of the filtrate and initial water, and the equations added to those to be solved. The ratio of carbon to oxygen is enabled by the present invention and may be obtained from inelastic neutron scattering in a known manner. The carbon to oxygen ratio may also be used to check the saturation calculations or be incorporated in the equations as additional information. As is known in petrophysical interpretation, equations do not cover all the physical processes at work and measurements are imperfect. \ Mathematical optimization software, sometimes termed well-log inversion software, is an example of a technique that would determine the best results consistent with the totality of measurements and equations.

As is known in the industry, the intrinsic sigma $\Sigma_{intrinsic}$ of a fluid-saturated porous formation is the linear combination of the fractional volume of each constituent weighted by the sigma value for that constituent. The relationship may be expressed as:

$$\Sigma_{intrinsic} = (1-\varphi-V_{sh})\Sigma_{ma} + V_{sh}\Sigma_{sh} + \varphi(1-W_w)\Sigma_{hc} + \varphi S_w \Sigma_w \quad \text{(Equation 1)}$$

where:
$\varphi$ is the formation porosity (so that the solid fraction of the formation is $1-\varphi$);
$V_{sh}$ is the fractional volume of the shale component within the formation matrix (assuming structural clay distribution);
$S_w$ is the fractional component of a mixture of water within the pore space (the remaining pore space $1-S_w$ is hydrocarbon saturation $S_{hc}$, where $S_w + S_{hc} = 1$);
$\Sigma_{ma}$ is the capture cross section of the non-shale minerals in the formation matrix;
$\Sigma_{sh}$ is the capture cross section of the shale in the formation matrix; and
$\Sigma_w$ is the capture cross section of a mixture of water in the formation matrix.

The first two terms on the right hand side of Eq. 1 are for the solid constituents of the formation:

$$\Sigma_{solids} = (1-\varphi-V_{sh})\Sigma_{ma} + V_{sh}\Sigma_{sh} \quad \text{(Equation 2)}$$

such that:

$$\Sigma_{intrinsic} = \Sigma_{solids} + \varphi(1-S_w)\Sigma_{hc} + \varphi S_w \Sigma_w \quad \text{(Equation 3)}$$

The third term of Eq. 3 is for (the average of) the water constituent of the formation. Prior to the drilling of a well, the formation of interest is hydrocarbon bearing, and the water content is immovable, bound, or trapped. This initial water has saturation denoted $S_{wi}$ and has sigma $\Sigma_{wi}$ associated therewith, so that the water term of Eq. 3 becomes:

$$\varphi S_w \Sigma_w = \varphi S_{wi} \Sigma_{wi} \quad \text{(Equation 4)}$$

If the particular well of interest is drilled with water-based drilling mud, the water in the mud at the depth of interest 130 will typically have a different salinity than the initial formation water, and so it will be associated with a different sigma value, denoted as $\Sigma_f$. The mud is solids laden and of sufficient density, or graded in density, to prevent the well from collapsing. This means the mud pressure exceeds the reservoir pressure at every depth, commonly termed the over-balance pressure. The over-balance pressure drives water from the mud into the formation, displacing oil away from the wellbore. The solids in the water-based mud cannot permeate very far into the formation and are left as a filter-cake, or mudcake, on the borehole wall, building in thickness until it forms an almost impermeable barrier and filtration is reduced to a very low rate. The region of the formation surrounding the borehole wall is now largely oil-free, with the pore space containing filtrate, initial water, and oil. The total water saturation is denoted $S_{xo}$ and its associated sigma value is denoted as $\Sigma_{xo}$. As described herein above, the sigma measurement is shallow, and measures constituents in the invaded zone. Therefore after invasion by the water-based mud at t=0, the average water term in Eq. 4 becomes:

$$\varphi S_w \Sigma_w = \varphi S_{xo} \Sigma_{xo} \quad \text{(Equation 5)}$$

The initial water saturation $S_w = S_{wi}$ may, for example, be 20%. In the process of invasion, $S_w$ increases to perhaps 60%. This condition at t=0 is $S_w = S_{xo}$ which may be measured with varying accuracy, for example, on a conventional resistivity logging tool run. For wells drilled with water-based drilling mud, $S_{xo}$ may always greater than $S_{wi}$. A shallow resistivity tool of the prior art measures resistivity in the invaded zone. This shallow resistivity measurement is related to the amount of conducting fluid in the invaded zone and hence to water saturation. However, such a resistivity measurement is unable to distinguish between the initial and filtrate portions of the fluid, which may have widely varying salinity. An example of where $S_{xo}$ can be obtained sufficiently accurately is when the filtrate is both very saline and is injected at high over-balance pressure in a carbonate. Here, the initial water saturation might be only 5% but the increased saturation may be 80%. In this case, almost all the fluid resistivity is attributable to the filtrate, and in combination with a value for filtrate resistivity (such as derived from a surface measurement) and porosity, a value for $S_{xo}$ can be estimated.

Because the water is a mixture of salinities, the invaded sigma is an average of the different water sigmas, and must be based on their relative saturations. Although the initial water saturation may be small, it may have a high salinity and be as important a component of the apparent sigma as the filtrate.

Therefore it is an aspect of the present invention to have a more precise expression for the water term using the individual filtrate and initial water terms:

$$S_w = S_f + S_{wi} \quad \text{(Equation 6)}$$

$$S_w \Sigma_w \geq S_f \Sigma_f + S_{wi} \Sigma_{wi} \quad \text{(Equation 7)}$$

As described herein above, the formation testing tool 602 is positioned at a predetermined depth 130. After the draw down pretest is performed, a lengthy period of pumping is commenced. Pump 180 continues to pump fluids through hydraulic line 181 and into measurement units 183 and 184 which may comprise various instruments such as fluid resistivity, fluid density, and optical density, until the measurement units and stabilization of the measured sigma indicate that the fluid is largely free of contamination within the formation. The ability of the present invention to provide a measurement of contamination within the formation is yet another example of in situ measurements of petrophysical parameter of the present invention. A fluid sample may be taken and placed in a container 188 for examination at the surface 51.

As described herein before, it is important to determine during pumping whether the fluid pressure has dropped below the bubble point of one of its volatile components. The formation tester 602 preferably includes a bubble point detector as is known within one of the measurement units 183 and 184. However, a formation tester of the present invention further includes means of detecting gas breakout within the testing volume 187. It should be apparent to those skilled in the art, that the sigma measurements of the present invention improve over the prior art by enabling the detection of gas breakout in the formation itself in real-time. The sigma measurement of the present invention is sensitive to gas breakout because the position and selection of the source 603 and detectors 605, 613, and 614 enable detection of discrete changes in, and levels of, sigma values associated with the different constituents within the testing volume 187. For instance, the sigma value of a hydrocarbon containing solution gas is approximately 8 to 13 c.u. The sigma value associated with oil is approximately 17 to 20 c.u. The sigma value associated with saline water is normally above 45 c.u. The present invention is able to discern these differences and thereby identify if, and advantageously when, the fluid pressure within the testing volume 187 within formation 106 has dropped below the bubble point of one of its volatile components. Therefore, in the present invention, the sigma measurement may be used as a real time, in situ fundamental gas breakout detector before, during, and after pumping for the purposes of clean up and sampling. Moreover, the pressure at which gas breakout is detected is the bubble point of the hydrocarbon within the formation, and this bubble point pressure is itself a valuable measurement. The measurement is only possible if the formation pressure in the test volume 187 during pumping falls sufficient to cause gas breakout. This will depend on the hydrocarbon in question, the reservoir pressure and temperature, and the pressure drawdown capabilities of the tool.

As discussed herein before, it is beneficial to know the salinity of the water in the formation 106. The formation tester 602 may include resistivity and density measurement capability within one of the measurement units 183 and 184. However, where the filtrate and initial water salinities are similar, the measurements made within the tool, on the pumped fluid, may not discern a change in salinity in the fluid mixture as pumping proceeds. This may be mitigated in known practice by ensuring the WBM water has a high salinity. The sigma measurement of the present invention is however sensitive to the salinity level in the formation and is able to detect changes in intrinsic sigma values associated with the salinity of the constituents at the borehole wall 135 and within the testing volume 187. The ability to discern the levels of salinity with the present invention provides a method of monitoring the cleanup, in situ, within the testing volume 187 by analyzing the intrinsic sigma values into the fluid constituents before, during, and after pumping, providing a measure of the progress of clean-up in addition to those measurements made within the tool.

The capability of formation tester 602 to discern the levels of salinity is best shown by way of example. In a representative reservoir with the formation tester 602 positioned at depth 130, the temperature may be 200 degrees F. (as determined by a temperature sensor within measurement units 183, 184, or elsewhere) and the pressure $P_M$ may be 5000 psi (as determined by a temperature sensor within measurement units 183, 184, or elsewhere). The formation at an initial time may contain two water constituents, one is filtrate and the other is initial formation water. The salinity associated with the filtrate under these conditions is known to be approximately 150 kppm and the salinity associated with the formation water under these conditions is known to be approximately 175 kppm. As the clean-up process progresses the salinity of the fluid should approach the 175 kppm level. The resistivity value associated with the filtrate under these conditions is approximately 0.019 ohms and the resistivity value associated with the water under these conditions is approximately 0.021 ohms. The resistivity measurements that reported by measurement devices 183 and 184 as the clean-up process progresses may not be able to resolve the small change in the resistivity value. However, the sigma value associated with the filtrate under these conditions is approximately 76 c.u. and the sigma value associated with the water under these conditions is approximately 87 c.u. which is readily discernible. Thus, the present invention is able to continuously monitor the clean-up as the initial reported sigma would be 76 c.u. and the eventual sigma value for water would approach 87 c.u.

Similarly, subtle changes in oil properties with a gas to oil ratio (GOR) can be detected by the sigma measurement of the present invention due to its sensitivity with respect to gas. This is particularly important in EOR applied fields, such as when gas injection in the reservoir oil is miscible and liquid oil in the reservoir has varying solution gas. For example, a difference between oil at 1000 GOR and 2000 GOR is around 1 c.u. of sigma. The tool of the present invention is stationary for significant periods, allowing a large number of counts to be accumulated and so improve the counting statistics. Modeling of the sigma resolution has found it to be around 0.3 c.u. Accordingly, a feature of the present invention is that by measuring sigma at different depths and zones of different GOR, whether naturally grading, occurring or induced by injection may be discerned, which is not achievable by the prior art. This GOR discrimination is invaluable to the proper characterization and exploitation of reservoirs.

The reported apparent sigma value starting at time $t=t_0$ is $\Sigma_{intrinsic0}$, when the formation oil bearing rock is in the invaded condition. The detectors 605 and 613 capture and report data on an ongoing scheduled basis and report the apparent sigma at times $t_1, t_2 \ldots$ eventually ending at $t=t_N$ and $Y_{intrinsicN}$ when the formation at the probe is restored, and the filtrate has been removed. This point is inferred from the apparent sigma reaching a stable value and other indications from measurement devices 183 and 184, such as an optical analyzer, or density contamination monitor. The sigma data reported from all of the events during the testing may be reported in a table, or log, that is stored within the tool itself (in a storage medium) or reported to computer 50 at the surface 51 and stored therein.

It should be apparent to those skilled in the art that certain constituent values (solids, filtrate and water and their sub-components) may be known or may be ascertained by known methods and others may not be known or ascertained. In addition, depending on the particular well, well testing and measurement devices, some of the values of Eq. 3 may be more reliable than others. As discussed herein above, the present invention captures data on a scheduled basis and during cleanup the time series is from $t_0$ to $t_N$. Now with reference back to the equations 3, 6, and 7 and appending a time subscript $_{0, 1 \ldots N}$ to the various parts of the measurement and noting the first and last special cases (invaded and restored respectively), we have the following expressions for the apparent measured sigma for the time series:

$$\Sigma_{intrinsic0} = \Sigma_{solids} + \varphi(1 - S_{f0} - S_{wi})\Sigma_{hc} + \varphi S_{f0}\Sigma_f + \varphi S_{wi}\Sigma_{wi}$$

$$\Sigma_{intrinsic1} = \Sigma_{solids} + \varphi(1 - S_{f1} - S_{wi})\Sigma_{hc} + \varphi S_{f1}\Sigma_f + \varphi S_{wi}\Sigma_{wi}$$

$$\Sigma_{intrinsic2} = \Sigma_{solids} + \varphi(1 - S_{f2} - S_{wi})\Sigma_{hc} + \varphi S_{f2}\Sigma_f + \varphi S_{wi}\Sigma_{wi}$$

$$\Sigma_{intrinsicN} = \Sigma_{solids} + \varphi(1 - S_{wi})\Sigma_{hc} + \varphi S_{wi}\Sigma_{wi}$$

where $S_{xo} = S_{f0} + S_{wi}$.

Values for certain quantities can be obtained by alternative means such as conventional wireline logging tools for porosity ($\varphi$), deep resistivity for $S_{wi}$, and shallow resistivity for $S_{xo}$. Published tables of hydrocarbon data provide values for $\Sigma_{hc}$ such as those published in "Crain's Petrophysical Handbook".

In order to solve for the unknowns, one can start by subtracting the last and first measurements in the sequence, $$\frac{\Sigma_{intrinsicN} - \Sigma_{intrinsic0}}{\varphi} = \qquad \text{(Equation 8)}$$
$$-S_{f0}(\Sigma_f - \Sigma_{hc}) = -(S_{xo} - S_{wi})(\Sigma_f - \Sigma_{hc})$$

If the value for sigma hydrocarbon is known accurately, then this leaves a single unknown in the filtrate sigma, which can therefore be calculated by simple rearrangement:

$$\Sigma_f = \Sigma_{hc} - \frac{\Sigma_{intrinsicN} - \Sigma_{intrinsic0}}{\varphi(S_{xo} - S_{wi})} \qquad \text{(Equation 9)}$$

Similarly, if one skilled in the art can determine sigma filtrate $\Sigma_f$ by another means such as assuming that $\Sigma_f = \Sigma_{xo}$, effectively ignoring the initial water content, then one can re-arrange the same equations and solve for $\Sigma_{hc}$:

$$\Sigma_{hc} = \frac{\Sigma_{intrinsicN} - \Sigma_{intrinsic0}}{\varphi(S_{xo} - S_{wi})} + \Sigma_f \qquad \text{(Equation 10a)}$$

To summarize the basis for the terms $S_{xo}$ and $S_{wi}$ may both be obtained from open hole logs using shallow and deep resistivities respectively, porosity $\varphi$ from porosity measurements and $\Sigma_{intrinsicN} - \Sigma_{intrinsic0}$ is measured from the intrinsic sigma values measured by the present invention at the beginning and end of pumping (from $t_0$ to $t_N$).

As discussed herein above, various values for the constituents in Eq. 1 may be more accurate or reliable than others. For instance, it is widely accepted that the values for sigma hydrocarbon available in published are "good enough" for prior purposes, but since the exact hydrocarbon of a particular formation of interest may not be known ahead of time, the present invention provides a real time, in situ, measurement for sigma hydrocarbon. Other sampling techniques may be used but as mentioned herein before the results may take weeks to months to obtain in a laboratory. The sigma hydrocarbon value $\Sigma_{hc}$ obtained directly from the present invention may be verified using the gas to oil ratio measurement from an optical analyzer of measurement devices 183 and 184 and the reservoir pressure as input into the published sigma hydrocarbon tables. Alternatively, if sigma filtrate $\Sigma_f$ is suspect then the value of $\Sigma_{hc}$ from tables can be improved upon as follows. The optical analyser of measurement devices 183 and 184 may be used to determine the gas to oil ratio (GOR) of the sample oil that contains solution gas. GOR is a sensitive input to the tabulated sigma hydrocarbon values and using it in conjunction with reservoir pressure will give an improved value.

Rearranging the intrinsic sigma time series equations and inserting the sigma hydrocarbon and sigma filtrate values allows the filtrate saturation to be calculated in each case, and hence the water saturation, as shown here for exemplary time $t=t_1$:

$$\frac{\Sigma_{intrinsic1} - \Sigma_{solids}}{\varphi} - \Sigma_{hc} - S_{wi}(\Sigma_{wi} - \Sigma_{hc}) = S_{f1}(\Sigma_f - \Sigma_{hc})$$

and thus becomes $$S_{w1} = S_{f1} + S_{wi} = \frac{\frac{\Sigma_{intrinsic1} - \Sigma_{solids}}{\varphi} - \Sigma_{hc} - S_{wi}(\Sigma_{wi} - \Sigma_f)}{\Sigma_f - \Sigma_{hc}} \quad \text{(Equation 10b)}$$

As one skilled in the art should appreciate, the present invention enables the real time derivation of a water saturation value at all times during the pump process starting from the invaded formation and ending at the restored formation. It should be appreciated from the foregoing that the present invention yields a time series of values for water saturation which allows important laboratory measurements of the prior art, to be transferred, with suitable modifications, to in situ real time measurements.

It is typical of formation testers of the prior art, as well as the present invention, to make periodic water-cut measurements on the fluids flowing through hydraulic line 181 during the clean-up process, using well known methods such as from the measurement devices 183 and 184 which may include an optical spectrum of an optical spectrometer, or from an electrical water-cut instrument such as an electrical impedance measurement. Other measurement values are also provided in the present invention by measurement devices 183 and 184 that include flow rate to provide a measurement value for the rate at which fluid is traveling within hydraulic line 181. As discussed herein above, the filtrate is first produced when the pumping starts at the beginning of the clean-up process. As the pumping and clean-up progresses, filtrate is first drained from the formation and then increasing amounts of oil. It follows from above that the present invention provides a value for water-cut (volume fraction of water in the oil and water mixture) and the flow rate of fluid through the tool. The present invention further provides a water saturation measurement as a function of time during the clean-up process. The combination of this data can be used to produce a fractional flow curve in real time. The significance of this discovery can be visualized using the well-known Buckley-Leverett theory. It is known to inject water into a well adjacent to a producing well to displace the oil toward the producing well.

Figure 8:
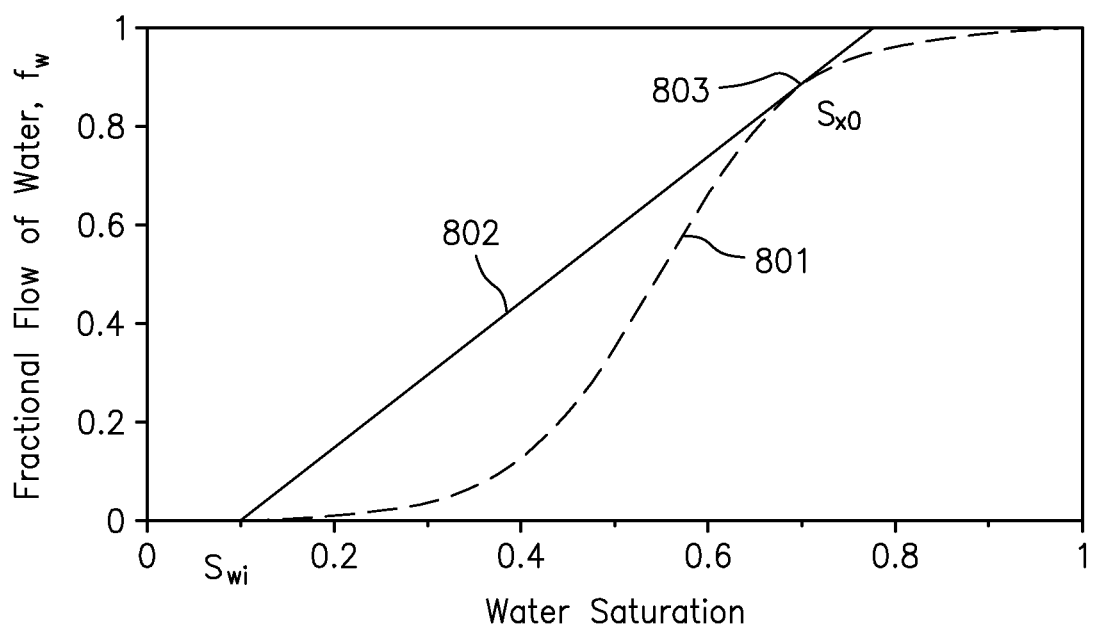
FIG. 8 is a graphical representation of the fractional flow of water versus water saturation in accordance with certain aspects of the present disclosure.

With reference to FIG. 8, line 801 represents the data from formation tester 602. The tangent line 802 intersects line 801 at point 803. This point represents the water saturation at the displacement front that would obtain in a water-flood. Thorough explanations may be found in the prior art such as set forth in "Fundamentals of Reservoir Engineering", L P Dake, 1988.

Still referring to FIG. 6, and as discussed herein above, during the clean-up process, fluid pumping proceeds and formation fluid 140 is displaced and moves towards the sampling point (for example the probe 165 or straddled zone 136 of FIG. 3), a three-dimensional oil cone depicted by lines 191 is developed. When the oil cone 191 reaches probe 165, the cone starts to broaden. The spatial response of the sigma measurements corrected according to the present invention made from this time onwards will lie essentially within the cone, and the foregoing times $t_1, t_2 \ldots t_N$ apply. If pump 180 is stopped, the pressure at the probe 165 will start to recover towards reservoir pressure $P_R$. Formation tester 602 further includes a pressure sensor 193 in hydraulic line (flow line) 181. Pressure sensor 193 may be part of pretest module 182 but in any case has the ability to sense the pressure at the probe 165. Pressure sensor 193 continuously takes pressure measurements during the recovery event and a pressure build-up curve can be generated therefrom. Within the first minute or so of recovery, there will usually be sufficient pressure recovery to be able to estimate the fluid mobility from the pressure build-up curve using well-known standard theories as disclosed in "Pressure Buildup and Flow Tests in Wells", C S Matthews and D G Russell 1967. Pump 180 can then be restarted and pumping of formation fluid 140 is then resumed. It has been discovered that the interruption of pumping for a short time does not greatly disrupt oil cone 191, and that in a few minutes, perhaps five minutes, the oil cone will be restored. The process of stopping then quickly restarting the pump may be repeated on a representative interval of ten to twenty minutes, yielding an adequate number of sample points. The cycle may finish in a longer interval to ensure minimum contamination for sample taking. Although shown and referred to as an oil "cone" it should be apparent to one skilled in the art that the size and shape of test volume 187 will be different for different embodiments of probes and for embodiments employing straddle packers wherein the testing volume is more like a portion of an annular cylinder surrounding the borehole.

Another method of determining the fluid mobility is to model the drawdown of pressure while the pump 180 continues to run. For example if the flow rate is constant, then the drawdown pressure will vary as mobility changes. This method is typically less accurate than the previously described build-up method because of the potential for changes in flow resistance near the well bore, known in the prior art as skin effect.

Mobility of a fluid component is commonly defined as the ratio of its permeability to its dynamic viscosity. Since viscosity is strongly sensitive to changes in temperature, the mobility in the formation and the fluid viscosity should be measured at the same temperature, and preferably by a viscometer in a tool of the present invention placed near the orifice (not shown) through which the fluid is obtained. Using measured water saturation, mobility, water-cut and viscosities at times $t_0$ through $t_N$, as described herein above, the present invention is able to measure the relative permeability to flow of the sampled fluid at the water saturation at the time of sampling as is will be described immediately herein below with reference to FIG. 9. It should be appreciated that, since the methods of this invention do not require the use of techniques that create heat in the test volume, the accuracy of the permeability measurements is ensured. One use of relative permeability curves as a function of saturation is that they provide essential information for designing water-flood recovery programs.

Figure 9:
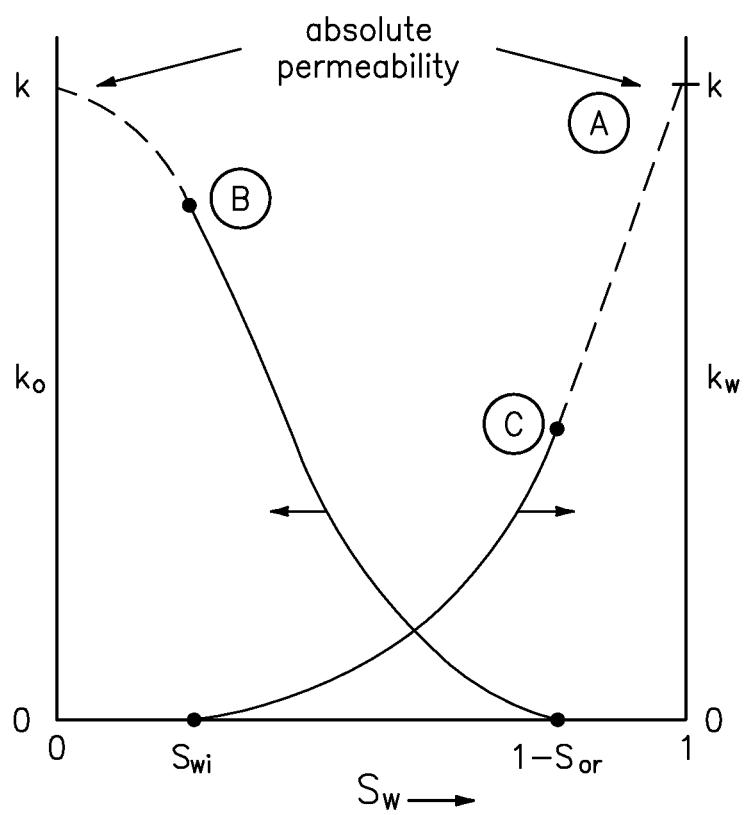
FIG. 9 is a graphical representation of relative permeabilities in accordance with certain aspects of the present disclosure.

Illustrated in FIG. 9 is a generally accepted curve showing the characteristics of permeabilities to oil and water in formations as a function of water saturation. It will be appreciated that complete evaluation of the data must be done in conjunction with reservoir models whose equations include the time variation, compressibilities, reservoir structure, and other properties during the pumping and pretest operations. Point A is the permeability of the formation when fully saturated with water and is the same as if it were fully saturated with oil. Point B is the permeability to oil in a fully restored reservoir, where the initial water saturation $S_{wi}$ is obtained. The water permeability at this saturation is zero because the water is immovable. Point C is the permeability to water when the formation is invaded, and the water saturation is $S_{xo}$, or equivalently the residual oil saturation is $S_{or}=1-S_{xo}$. The permeability to oil at this saturation is zero because the oil is immovable.

In the pumping sequence at time to the saturation is $S_{xo}$, corresponding to point C. Since the formation fluid is mostly water, the permeability to water $k_w$ may be approximately determined as mobility multiplied by viscosity. In the pumping sequence at time $t_N$, the saturation is $S_{wi}$, corresponding to point B. Since the fluid at point B is all oil, the permeability to oil $k_o$ may be determined as mobility multiplied by viscosity.

At intermediate times $t_1$ and $t_2$, the saturation varies but, as explained herein before, can be determined. From standard theories, the mobility $m_t$ that is measured is the sum of the mobilities for the fluid components in proportion to the water-cut $f_w$. Using the water-cut measurement of the present invention described herein above, the water mobility is $f_w m_t$ and the oil mobility is $(1-f_w)m_t$ and the permeabilities to oil and water may be obtained as hereinafter before described at $t_0$ and $t_N$. The reading at point C, which is at $t_0$, may be improved using water-cut as at $t_1$ and $t_2$.

During the formation testing borehole operations, a nearby water reservoir at a different preselected depth 130, with similar lithology to a previously tested depth, may be selected ("wet zone"). Testing at the wet zone depth corresponds to point A as there is no oil present. Therefore, as for point C, the water mobility and viscosity may be obtained and thence formation permeability k. Relative permeabilities are then readily calculated from their definitions as $k_{ro}=k_o/k$ and $k_{rw}=k_w/k$. The measurement at t0, t1, . . . may be improved by using this water viscosity, as it is not contaminated by oil as the measurement of viscosity at time to might be.

Still referring to FIG. 9, another embodiment of the present invention is described for a method of estimating the individual permeabilities at intermediate water saturations. In theory, it is known to fit a curve, such as a quadratic curve, through the points A, C, and zero at saturation $S_{wi}$. If the points allow a smooth characteristic curve, then an estimate of water permeability is obtained at each saturation. This may be converted to water mobility by dividing by the water viscosity then subtracting from the measured total mobility to obtain the oil mobility and thence oil permeability.

Figure 10:
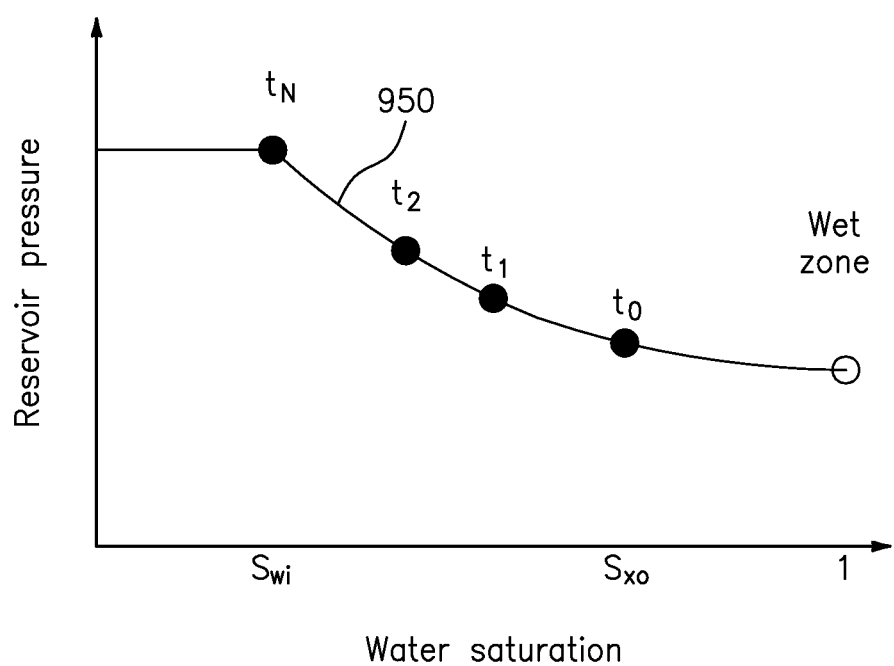
FIG. 10 is a graphical representation of a capillary pressure versus water saturation in accordance with certain embodiments of the present disclosure.

As is well known, capillary pressure is the difference between oil and water pressures in the formation. The capillary pressure curve of FIG. 10 may be obtained using the present invention by plotting changes in reservoir pressure as a function of water saturation. As described herein before, the present invention provides a method to obtain water saturation from sigma data obtained while pumping filtrate (secondary drainage) proceeds. Referring to the various embodiments shown in the figures, pump 180 may be periodically stopped to conduct a normal pretest using pretest module 182. As is known, the pretest will provide an accurate reservoir pressure $P_R$. This is an alternative to or additionally following stopping the pump for a build-up test as herein before described. The reservoir pressures are referenced to the value at $t_N$, when the reservoir is restored and the water saturation is at its initial value $S_{wi}$. Still referring to FIG. 10, when pump 180 is first started, the time is $t_0$ and the water saturation is $S_{xo}$. As pumping (secondary drainage) proceeds, the water saturation reduces at times $t_1$, $t_2$, . . . until irreducible water $S_{wi}$ is reached at time $t_N$. The capillary pressure curve 950 may be obtained by plotting the reservoir pressures so obtained as a function of water saturation. A curve fit may be used to extrapolate to complete water saturation, $S_w=1$. As described herein above with reference to FIG. 9, testing may be performed in a wet zone at a different preselected depth 130 (FIG. 1) which will provide a value for reservoir pressure with complete water saturation. This point may be used to verify the curve fit, or included in the curve fit with the data from times $t_0$, $t_1$, . . . . The curve pressures are then referenced by subtraction to the value at $t_N$, when the reservoir is restored and the water saturation is at its initial value $S_{wi}$. Each point $t_0$ to $t_N$ on the capillary pressure curve 950 follows from the reservoir pressure obtained from pretest module 182 (FIG. 1) and water saturation obtained from measured sigma. This in situ measurement of capillary pressure is not known in the prior art, and given the sensitivity of the sigma measurements made by the present invention to reservoir physical conditions, is quickly obtained and potentially superior to known laboratory methods.

The foregoing disclosure of the measurement of parameters as saturation changes has been presented in terms of the pumping out of filtrate to restore the formation. It will be appreciated that some of these parameters may be similarly obtained by injecting a fluid such as water in order to raise formation pressure, and observing the fall-off of pressure when the pump is stopped. Moreover, if water of accurately known properties is injected preferably after the formation has been restored, and monitored until the water saturation stabilizes at a high value (only immovable remaining oil left in the test volume 187 of FIG. 1), then it can advantageously be pumped out again following the procedures herein before disclosed, to obtain improved or confirmation results.

The foregoing disclosure of the measurement of parameters as saturation changes presumes the use of WBM. If OBM is used then the filtrate will typically be predominantly a synthetic oil. In this case, we can still determine the permeabilities of the initially invaded formation and of the restored formation, the latter determined as before from the contamination indicators within the tool and the stabilizing of the intrinsic sigma value. These values are at the same initial water saturation. Detection of gas breakout and bubble point measurement in the formation applies, as herein before described for water-based mud, where care is needed to exclude the oil filtrate as a possible source.

Now, with reference to FIG. 11, formation tester 602 includes bottles 188 which may advantageously be used to carry an enhanced oil recovery (EOR) material downhole within the tester. The EOR materials as described herein elsewhere may include water, dilute hydrogen peroxide, gas compressed at surface or compressed downhole, and potentially EOR bottles of different materials for alternative and sequential use. Tester 602 may also include a mixer/dispenser (not shown) to allow testing of combined EOR materials. The EOR materials may be injected and form an EOR cone 901 within testing volume 187 and may be further analyzed by the present invention as discussed herein below. It should be appreciated that it is within the scope of the present invention to include any number of probes or orifices and pumps to provide for the injection of EOR materials. For instance, the injection need not use the same pump and probe orifice as for sampling.

Considering now the use of a water-based displacement EOR material such as water or ASP, once again, a series of measurements, including the injected volume, is made at times $t_0, t_1, t_2, \ldots t_N$ until the apparent sigma measurement stabilizes at $t_N$. This notation is for convenience to enumerate measurement times and not intended to imply the same times as the pumping out phase. Injection may continue after $t_N$, monitoring volumes and pressure, to further explore the reservoir characteristics within testing volume 187.

The present invention utilizes the same time series of equations outlined herein above (with reference to pump-out phase) to monitor the injection of fluids in real time. During injection, all the parameters are known at to as this is essentially $t_N$ of the pump-out phase:

$$\Sigma_{intrinsic0} = \Sigma_{solids} + \varphi(1-S_{wi})\Sigma_{hc} + \varphi S_{wi}\Sigma_{wi} \quad \text{(Equation 11)}$$

The EOR fluid is injected as described above to form EOR cone 901 within testing volume 187. The saturation of EOR fluid is $S_e$ and its sigma, because it is a known substance, may be based, for example, on laboratory measurement or elemental calculation or other means. At representative time $t_1$, $$\Sigma_{intrinsic1} = \Sigma_{solids} + \varphi(1-S_{e1}-S_{wi})\Sigma_{hc} + \varphi S_{e1}\Sigma_e + \varphi S_{wi}\Sigma_{wi} \quad \text{(Equation 12)}$$

All of the constituent values and quantities are now known except for $S_{e1}$, which can thus be calculated by rearranging this expression in the same way as the filtrate saturation was previously calculated:

$$S_{e1} + S_{wi} = \frac{\frac{\Sigma_{intrinsic1} - \Sigma_{solids}}{\varphi} - \Sigma_{hc} - S_{wi}(\Sigma_{wi} - \Sigma_e)}{\Sigma_e - \Sigma_{hc}} \quad \text{(Equation 13)}$$

From these relationships, it should be apparent to those skilled in the art that the in situ effectiveness of the EOR fluids on enhancing oil recovery in the formation can be determined in real time using the present invention. It follows that it is an important aspect of the present invention that the effectiveness of an EOR fluid can be evaluated by the measured injected volume as a function of its saturation. The remaining oil saturation is obtained from the final measurement as:

$$S_{OR} = 1 - S_{eN} - S_{wi} \quad \text{(Equation 14)}$$

One advantage of obtaining $S_{OR}$ is that this value may be used to calibrate subsequent core analysis performed in a laboratory. Unlike the prior art of log-inject-log over a section of open-hole and in multiple logging passes, the present invention injects EOR fluids in known volume at a specific point in the context of a series of controlled tests that first restored the formation at that point and characterized it.

In this instance, where the EOR materials may be complimentary in effectiveness, such as injecting ASP after injecting water, the present invention allows for the repeated process outlined above wherein a second injection can be performed at the same predetermined depth 130 and with a second (and further subsequent) EOR material to obtain second $S_{OR}$. Reductions in remaining oil saturation demonstrate the effectiveness of the subsequent EOR materials.

There are examples in the prior art of attempts to obtain the petrophysical parameters of a formation in real time while dynamically flowing, i.e. pumping and/or injecting fluids. However, none of prior art examples teaches or suggests an apparatus or method that provides real time, in situ testing confined to a testing volume of the formation that replicates true reservoir conditions in terms of the petrophysical parameters of interest. For example, in U.S. Pat. No. 8,794,318, to Harrigan teaches the forming of a hole in the formation using, for example, a drill. In so doing, Harrigan physically alters the formation and its stresses and changes the petrophysical parameters of interest, such as permeability, porosity, wettability and viscosity among others, in the area of measurement. In addition, and in some embodiments, Harrigan injects electrical energy into the formation. As explained herein before, adding energy to the formation may change its fluid temperature sufficiently enough to cause significant errors in the conversion to permeability of mobility measured in the formation and viscosity measured in the tool. It should be appreciated by those skilled in the art that, as set forth herein, the present invention maintains the formation in the testing volume in an unchanged and undamaged state while dynamically flowing fluids in and out of the testing volume and while measuring various petrophysical parameters.

Gas provides a further example of injecting EOR materials into the testing volume so as to once again displace the oil, following the restoration of oil in the pump-out phase. One important reservoir application is the re-injection of gas into the formation, for storage, disposal, or for displacing oil towards another well. The gas may be natural gas that would otherwise be flared (wasted), sour gas ($H_2S$) that is dangerous to store at surface and expensive to render safe, or gas expressly selected for displacement and viscosity reduction, such as $CO_2$.

It is important to know the pressure at which to inject this gas as if the pressure is too low it will not go into solution, and will instead migrate to another producing well. If the pressure is excessively high then enormous expenditure in surface facilities will have been unnecessarily incurred.

The minimum pressure to ensure the gas will go into solution is termed the Minimum Miscibility Pressure (MMP). A formation tester representative of the present invention may advantageously have the ability to inject such a gas into the test volume as described herein above. Alternatively, the tool may access a gas-saturated solution which it flashes by first reducing its pressure, in order to obtain free gas. Alternatively, the well may be spotted with a fluid incorporating solution gas, in particular with $H_2S$ in the order of 15-20%, which is first ingested by the pump into a container then flashed to provide the necessary gas. Alternatively, a gas may be injected into the well which is then ingested by the pump and injected into the formation. The well bore may therefore be used to provide an essentially infinite supply of gas or liquid for the purposes of this invention if so required. Alternatively, for a coiled tubing or drill pipe-conveyed tool, the conveyance is a tubular that it may also be used to deliver EOR material.

The first step in determining the MMP with the present invention is to inject a known quantity of gas into the formation at a pressure that is assuredly higher than the MMP. This value can be estimated based on fluid and gas properties and on experience or a laboratory test. As the gas is being injected, the apparent sigma of the testing volume 187 is monitored. If the gas goes into solution, the sigma will reduce only slightly, where example sigma values were given above. The injection rate is then slowed to reduce the injection pressure, and the sigma monitored. The process is repeated until the sigma value shows a marked drop, in which case the gas is not going into solution. The pressure, as measure by sensor 193, at this point is the MMP. To better understand the significance of this measurement, in terms of the contrast of sigma oil to sigma gas, sigma oil ranges from 18-22 c.u., while sigma gas ranges from 6-13 c.u. The differences in these values is easily discernible by the present invention.

It is an important aspect of this invention to start with a pressure above the MMP. Because as the gas is being injected, there will be a declining pressure gradient from the point of injection to a point deeper into the testing volume. Gas initially injected into the formation below the MMP will migrate deeper into testing volume 187 under the influence of the pressure gradient. Subsequent gas above the MMP will go into solution, however, the earlier injected gas will still be free. After reaching such a point, the tool will have to be unset and set at a new depth 130, provided the bed of interest is thick enough for an independent test.

In contrast to this in situ procedure, the method typically used in the laboratory to obtain MMP involves injecting gas into a cylinder of fluid. Because there is no permeable medium, there is no pressure gradient in the vessel and the technique of starting with a high pressure does not arise. The laboratory test is also unrepresentative because it does not take into account the effects of the formation and nor does it use the actual reservoir fluid.

An injection may be followed by pumping out to restore the formation. In so doing, the saturation may again be calculated following the principles described herein before. The tool measurement analyzers will now measure the properties of the modified EOR and reservoir oil. For example if gas was injected to modify the oil viscosity, the GOR and viscosity of the pumped-out fluids, along with sigma measurements, will aid evaluation of effectiveness.

It will be appreciated by those skilled in the art that the derived neutron measurements of sigma, and carbon to oxygen ratio and corresponding saturation levels produced at an earlier point in time may be retained and compared with those obtained at a later point in time. For instance, initial well conditions can be determined either while drilling, or in the case of an open hole, wireline formation tester and later compared to formation testing done behind the casing of the same reservoir as it ages. Changes in the saturation levels will be readily known and changes in the reservoir conditions can be determined directly therefrom.

While the foregoing is directed to only certain embodiments of the present invention, certain observations of the breadth of the present invention should be made. Wireline, as referred to herein, may be electric wireline including telemetry and power. Wireline may also include wired slickline and wired coil tubing. Embodiments of the present invention include pumped-down-the-drill-pipe formation testing where the tools described herein exit through the drill bit. Otherwise heretofore conventional LWD that may now include the present invention allow for formation testing and sampling where the drill pipe may be wired for power and telemetry or some other telemetry such as mud pulse or electromagnetic through the earth. Further, commands and data can be stored using battery power, and power can come from a turbine during circulation. The present invention further includes permanent installation of neutron generator sources and detectors within a well bore to produce ongoing surveillance of saturation levels and other well parameters described herein.

While the foregoing is directed to embodiments of the present invention, other and further embodiments of the invention may be devised without departing from the basic scope thereof, and the scope thereof is determined by the claims that follow.

What is claimed is:

1. A method for measuring a parameter within a formation, the formation having a first fluid comprising a plurality of constituents therein,
comprising the steps of:
positioning and releasably fixing a formation tester at a predetermined depth within a well bore in the formation;
sealing a portion of a wall of the well bore and providing a sealed area;
positioning a fluid communication device having at least one orifice positioned within the sealed area;
directing a neutron energy burst into the formation;
sensing a return neutron signal from a testing volume proximate the sealed area in the formation;
obtaining an apparent sigma of the testing volume;
correcting the apparent sigma in relation to the testing volume to obtain an intrinsic sigma for the testing volume;
obtaining a plurality of sigma values from the intrinsic sigma for the plurality of constituents; and
determining the parameter in the testing volume using the plurality of sigma values.

2. The method of claim 1 further comprising pumping the first fluid from the formation into the testing volume and into the at least one orifice and into the formation tester.

3. The method of claim 2 wherein the determining the parameter is selected from a group of parameters consisting of contamination, gas to oil ratio, porosity, bubble point, saturation, or any combination thereof.

4. The method of claim 3 further comprising determining at least one of a mobility, an oil permeability, a water permeability, a capillary pressure, or a fractional flow with respect to saturation.

5. The method of claim 2 further comprising pumping a second fluid from the formation tester into the testing volume.

6. The method of claim 5 wherein the second fluid is comprised of an enhanced oil recovery fluid.

7. The method of claim 6 wherein the apparent sigma for the testing volume includes a value indicative of an effectiveness of the enhanced oil recovery fluid.

8. The method of claim 1 wherein the determining the parameter is determining a mineral content of the testing volume.

9. The method of claim 8 wherein the mineral content is indicative of aluminum.

* * * * *